(12) United States Patent
Kawamura et al.

(10) Patent No.: US 8,649,956 B2
(45) Date of Patent: Feb. 11, 2014

(54) APPARATUS FOR ACQUIRING RESPONSIBILITY OF OXYGEN CONCENTRATION SENSOR

(75) Inventors: Yusuke Kawamura, Susono (JP); Takuya Matsumoto, Miyoshi (JP); Takashi Nakamura, Toyota (JP); Makoto Sato, Miyoshi (JP); Toru Kidokoro, Hadano (JP); Hiroshi Sawada, Gotenba (JP); Yasushi Iwazaki, Ebina (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 271 days.

(21) Appl. No.: 13/090,814

(22) Filed: Apr. 20, 2011

(65) Prior Publication Data

US 2011/0283981 A1 Nov. 24, 2011

(30) Foreign Application Priority Data

May 20, 2010 (JP) ................................. 2010-116331

(51) Int. Cl.
*F02D 41/14* (2006.01)
(52) U.S. Cl.
USPC ............ 701/103; 701/109; 123/672; 123/703
(58) Field of Classification Search
USPC ........ 701/103, 109; 123/672, 703; 73/114.72, 73/114.73
See application file for complete search history.

(56) References Cited

U.S. PATENT DOCUMENTS

| | | | | |
|---|---|---|---|---|
| 6,694,244 B2 * | 2/2004 | Meyer et al. | ................. | 701/114 |
| 8,234,916 B2 | 8/2012 | Shibata et al. | | |
| 8,245,568 B2 | 8/2012 | Yoshikawa et al. | | |
| 2010/0319667 A1 * | 12/2010 | Yoshikawa et al. | ........... | 123/690 |
| 2010/0324802 A1 * | 12/2010 | Ogiso et al. | .................. | 701/103 |
| 2012/0209498 A1 * | 8/2012 | Aoki et al. | .................... | 701/103 |

FOREIGN PATENT DOCUMENTS

| | | |
|---|---|---|
| JP | A-61-170643 | 8/1986 |
| JP | A-04-365950 | 12/1992 |
| JP | A-11-072473 | 3/1999 |
| JP | A-2000-065782 | 3/2000 |
| JP | A-2001-242126 | 9/2001 |
| JP | A-2003-343339 | 12/2003 |
| JP | A-2004-069547 | 3/2004 |
| JP | A-2004-225684 | 8/2004 |
| JP | A-2006-057588 | 3/2006 |
| JP | A-2009-002280 | 1/2009 |
| JP | A-2009-127597 | 6/2009 |

* cited by examiner

*Primary Examiner* — Erick Solis
(74) *Attorney, Agent, or Firm* — Oliff PLC

(57) ABSTRACT

The fact that "with respect to a process in which the output value of a downstream air-fuel ratio sensor (sensor output value) is inverted from the minimum output value to the maximum output value during execution of an active control, the local maximum and minimum values of the secondary differential value of the sensor output value is widely affected by the size of the response delay of the downstream air-fuel ratio sensor and the size of the degree of the degradation of the three-way catalyst" is utilized. By preliminarily acquiring and memorizing, as maps, these relations obtained through an experiment, and applying the "local maximum and minimum values of the secondary differential value of the sensor output value" calculated from the transition of the sensor output value acquired during execution of the active control to the maps, the response delay (time constant) of the downstream air-fuel ratio sensor is acquired.

8 Claims, 15 Drawing Sheets

APPARATUS FOR ACQUIRING RESPONSIBILITY OF OXYGEN CONCENTRATION SENSOR

BACKGROUND OF THE INVENTION

1. Field of the Invention

The present invention relates to an apparatus for acquiring the responsibility of an oxygen concentration sensor. In the present invention, as an oxygen concentration sensor, a well-known electromotive force-type oxygen concentration sensor (well-known concentration cell-type oxygen concentration sensor using stabilized zirconia) is supposed. The output value of this oxygen concentration sensor comes to the first predetermined value (minimum value) when the air-fuel ratio is leaner than the theoretical air-fuel ratio (lean air-fuel ratio), and comes to the second predetermined value (maximum value) when the air-fuel ratio is richer than the theoretical air-fuel ratio (rich air-fuel ratio), and rapidly changes from the first predetermined value to the second predetermined value when the air-fuel ratio changes from the lean air-fuel ratio to the rich air-fuel ratio, and rapidly changes from the second predetermined value to the first predetermined value when the air-fuel ratio changes from the rich air-fuel ratio to the lean air-fuel ratio.

2. Description of the Related Art

Conventionally, an air-fuel ratio control unit comprising a three-way catalyst disposed in an exhaust channel of an internal combustion engine, and an oxygen concentration sensor disposed below the three-way catalyst in the exhaust channel is widely known. A technology to perform the so-called active control, for example, in order to calculate the maximum oxygen storage capacity of a three-way catalyst, by using this unit is widely known (refer to Japanese Patent Application Laid-Open (kokai) No. 2009-127597).

The active control refers to a control to compulsively dissociate the air-fuel ratio above the catalyst from the theoretical air-fuel ratio, and typically a control to switch the air-fuel ratio above the catalyst from the rich air-fuel ratio to the lean air-fuel ratio based on the fact that the output value of this oxygen concentration sensor is inverted from the first predetermined value to the second predetermined value and to switch the air-fuel ratio above the catalyst from the lean air-fuel ratio to the rich air-fuel ratio based on the fact that the output value of this oxygen concentration sensor is inverted from the second predetermined value to the first predetermined value. Namely, the air-fuel ratio above the catalyst is set alternately at the rich air-fuel ratio and the lean air-fuel ratio periodically. By this execution of the active control, the maximum oxygen storage capacity of a three-way catalyst can be calculated every time when the air-fuel ratio above the catalyst is switched.

By the way, due to the degradation of the oxygen concentration sensor or the like, the responsibility of the oxygen concentration sensor may decrease (the delay in response may increase). When the responsibility of the oxygen concentration sensor decreases, the time period required for the output value of this oxygen concentration sensor to be inverted from the first predetermined value to the second predetermined value (or conversely) becomes longer. As the result of this, the fluctuation cycle of the air-fuel ratio during the execution of the active control becomes longer. This means that the acquired maximum oxygen storage capacity of a three-way catalyst is calculated to be larger than its actual amount. Accordingly, in order to accurately calculate the maximum oxygen storage capacity of a three-way catalyst, it is necessary to acquire the responsibility of the oxygen concentration sensor.

In order to acquire the responsibility of the oxygen concentration sensor, various techniques have been proposed. For example, in Japanese Patent Application Laid-Open (kokai) No. 61-170643, the time period required for said inversion when the output value of this oxygen concentration sensor to be inverted from said second predetermined value (maximum value) to said first predetermined value (minimum value) is detected and, based on this detection result, the responsibility of the oxygen concentration sensor is acquired.

SUMMARY OF THE INVENTION

The object of the present invention is to provide an apparatus for acquiring the responsibility of an oxygen concentration sensor which accurately acquires the responsibility of an electromotive force-type oxygen concentration sensor disposed below a three-way catalyst in an exhaust channel.

The apparatus for acquiring the responsibility of an oxygen concentration sensor, according to the present invention, comprises a three-way catalyst disposed in an exhaust channel of an internal combustion engine, an electromotive force-type oxygen concentration sensor disposed below said three-way catalyst in said exhaust channel, and an air-fuel ratio control means to control the air-fuel ratio in the exhaust gas flowing into said three-way catalyst (air-fuel ratio above catalyst).

Hereinafter, the case where the output value of this oxygen concentration sensor transitions so as to be inverted from the first predetermined value (minimum value) to the second predetermined value (maximum value) by adjusting the air-fuel ratio above catalyst to a (predetermined) rich air-fuel ratio by means of said air-fuel ratio control means is referred to as the "first case," and the case where the output value of this oxygen concentration sensor transitions so as to be inverted from the second predetermined value to the first predetermined value by adjusting the air-fuel ratio above catalyst to a (predetermined) lean air-fuel ratio by means of said air-fuel ratio control means is referred to as the "second case."

The feature of the apparatus for acquiring responsibility is in that, based on the transition of the output values of this oxygen concentration sensor obtained in said first case or said second case, the local maximum value and/or local minimum value in the secondary or more differential values of said output values with respect to time are calculated and, based on said calculated local maximum value and/or local minimum value, the responsibility of the oxygen concentration sensor is acquired.

The present inventors found that "the more the responsibility of an oxygen concentration sensor decreases (the more the delay in response increases), the more (the absolute value of) the local maximum value and/or local minimum value in the secondary or more differential values with respect to time of the output values of the oxygen concentration sensor obtained in the first case or the second case decreases." The above-described configuration is based on these knowledge. In accordance with the above-described configuration, the responsibility of an oxygen concentration sensor can be accurately acquired.

Hereinafter, the case where said "secondary or more differential value" is a "secondary differential value" will be mentioned. Hereinafter, the local minimum value in the secondary more differential values with respect to time of the output values of the oxygen concentration sensor obtained in the first case, or the local maximum value in the secondary differential values with respect to time of the output values of the oxygen concentration sensor obtained in the second case, is referred to as the "first extremum," and the local maximum value in the secondary more differential values with respect to time of the output values of the oxygen concentration sensor obtained in the first case, or the local minimum value in the secondary differential values with respect to time of the output values of the oxygen concentration sensor obtained in the second case, is referred to as the "second extremum." In the first and second extrema, the local maximum value comes to a positive value, and the local minimum value comes to an negative value. Hereinafter, the "local minimum value" shall mean the "absolute value of the local minimum value." Namely, "the local minimum value is large (small)" shall mean "the absolute value of the local minimum value is large (small)."

When the "secondary differential value" is utilized, the feature of the apparatus for acquiring responsibility is in that, based on the transition of the output values of this oxygen concentration sensor obtained in said first case or said second case, said first extremum is calculated and, based on said calculated first extremum, the responsibility of the oxygen concentration sensor is acquired.

The present inventors found that "the more the responsibility of an oxygen concentration sensor decreases (the more the delay in response increases), the more the first extremum and the second extremum decreases." The above-described configuration is based on these knowledge. In accordance with the above-described configuration, the responsibility of an oxygen concentration sensor can be accurately acquired base on the first extremum (will be mentioned in detail later). In addition, the fact that "the decrement in the first extremum due to the progression of the decrease in the responsibility of an oxygen concentration sensor is smaller than the decrement in the second extremum due to the progression of the decrease in the responsibility of an oxygen concentration sensor" is also found.

In this case, specifically, the relation between said responsibility of the oxygen concentration sensor and said first extremum obtained in said first case or said second case is preliminarily acquired. Based on this relation and said calculated first extremum, the responsibility of the oxygen concentration sensor is acquired. This relation may be defined with a map (table), and may be defined by an experimental formula (function) obtained by an experimental result.

It is preferred that the relation is acquired for each of multiple cases with different degrees of degradation of said three-way catalyst. The present inventors found that, in the case where the responsibility of an oxygen concentration sensor is identical, "the more the degradation of a three-way catalyst progresses, the more the first extremum increases." The above-described configuration is based on this knowledge. In accordance with the above-described configuration, regardless of the degree of degradation of a three-way catalyst, the responsibility of an oxygen concentration sensor can be acquired accurately as compared with the case where said relation is acquired only when of the degree of degradation of a three-way catalyst is identical.

In addition, in the apparatus for acquiring responsibility, it is preferred that, based on the transition of the output values of this oxygen concentration sensor obtained in said first case or said second case, said first extremum and said second extremum are calculated and, based on said calculated first and second extrema, the responsibility of the oxygen concentration sensor is acquired.

As mentioned above, when the responsibility of the oxygen concentration sensor decreases, not only the first extremum, but also the second extremum decreases. Accordingly, in accordance with the above-described configuration, the responsibility of the oxygen concentration sensor is acquired accurately as compared with the case where the responsibility of the oxygen concentration sensor is acquired based only on the first extremum.

In this case, specifically, the relation between said responsibility of the oxygen concentration sensor and said first extremum and said second extremum obtained in said first case or said second case is preliminarily acquired. Based on this relation and said calculated first and second extrema, the responsibility of the oxygen concentration sensor is acquired. This relation may be defined with a map (table), and may be defined by an experimental formula (function) obtained by an experimental result.

It is preferred that the relation is acquired for each of multiple cases with different degrees of degradation of said three-way catalyst. The present inventors found that, in the case where the responsibility of an oxygen concentration sensor is identical, "the more the degradation of a three-way catalyst progresses, the more not only the first extremum, but also the second extremum increases." The above-described configuration is based on this knowledge. In accordance with the above-described configuration, regardless of the degree of degradation of a three-way catalyst, the responsibility of an oxygen concentration sensor can be acquired accurately as compared with the case where said relation is acquired only when of the degree of degradation of a three-way catalyst is identical.

In the above-described apparatus for acquiring responsibility, the case where, by utilizing the above-mentioned active control, the maximum oxygen storage capacity of a three-way catalyst can be calculated every time when the air-fuel ratio above catalyst is switched between the rich air-fuel ratio and the lean air-fuel ratio is supposed. In this case, it is suitable that, as said first case, the case, where said output values of this oxygen concentration sensor transitions so as to be inverted from said first predetermined value to said second predetermined value in the condition where the degree of the discrepancy between the previous value and the current value of said calculated maximum oxygen storage capacity is judged as small, is used. Similarly, it is suitable that, as said second case, the case, where said output values of this oxygen concentration sensor transitions so as to be inverted from said second predetermined value to said first predetermined value in the condition where the degree of the discrepancy between the previous value and the current value of said calculated maximum oxygen storage capacity is judged as small, is used.

At the stage where enough time has not yet passed since the start of the active control (at the stage where the number of switching of the air-fuel ratio above catalyst is still low), the fluctuation pattern (waveform) of the air-fuel ratio in the exhaust gas flowing out from the three-way catalyst is likely to vary due to the surviving influence of the oxygen storage state of the three-way catalyst just before the start of the active control and the like. Namely, the value of the calculated maximum oxygen storage capacity and the secondary differential values (specifically, said first and second extrema) of the output values of the oxygen concentration sensor are also likely to vary. On the other hand, after enough time has passed since the start of the active control (after the number of switching of the air-fuel ratio above catalyst has come to enough high), the influence of the oxygen storage state of the three-way catalyst just before the start of the active control and the like disappears and the fluctuation pattern (waveform)

of the air-fuel ratio in the exhaust gas flowing out from the three-way catalyst is likely to become stable. Namely, this means that the difference (ratio) between the previous value and the current value of the maximum oxygen storage capacity decreases (the calculated individual maximum oxygen storage capacity becomes stable), and said first and second extrema can become stable values accurately representing the responsibility of the oxygen concentration sensor.

The above-described configuration is based on such knowledge. In accordance with this, the responsibility of the oxygen concentration sensor can be acquired accurately, as compared with the case where said first and second extrema are calculated from the transition of the output values of the oxygen concentration sensor obtained at the stage where enough time has not yet passed since the start of the active control (at the stage where the number of switching of the air-fuel ratio is still low).

DESCRIPTION OF THE PREFERRED EMBODIMENTS

Figure 1:
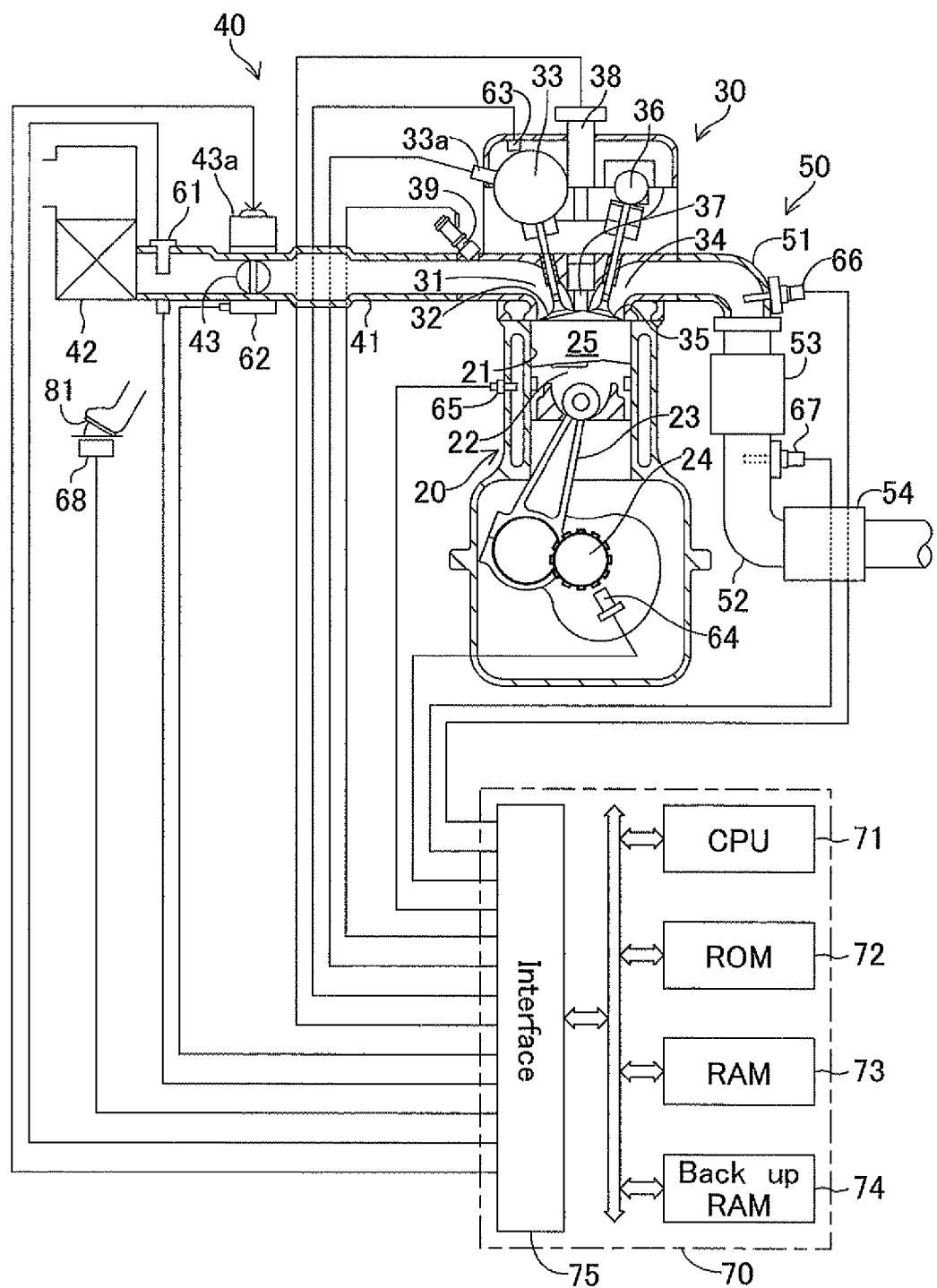
FIG. 1 is a figure showing schematic configuration of multi-cylindered internal combustion engine to which the apparatus for acquiring the responsibility of an oxygen concentration sensor according to an embodiment of the present invention is applied.

Hereinafter, referring to the drawings, the air-fuel ratio control unit comprising the apparatus for acquiring the responsibility of an oxygen concentration sensor according to the present invention (hereinafter, may be referred to simply as "the present unit") will be described.

(Configuration)

FIG. 1 shows a schematic configuration of a system wherein the present unit is applied to a gasoline 4-cycle spark-ignited multi-cylindered (four-cylinder) internal combustion engine. Although FIG. 1 shows only the cross-section of a certain cylinder, other cylinders also have similar configuration.

The internal combustion engine comprises a cylinder block portion 20 comprising a cylinder block, a cylinder block lower case, oil pan and the like, a cylinder head portion 30 fixed on the cylinder block portion 20, an intake system 40 for supplying gasoline-mixed air to the cylinder block portion 20, and an exhaust system 50 for emitting exhaust gas from the cylinder block portion 20 to outside.

The cylinder block portion 20 comprises a cylinder 21, a piston 22, a connecting rod 23 and crank shaft 24. They are configured so that the piston 22 moves in a reciprocating manner within the cylinder 22, and the reciprocating movement of the piston 22 is transmitted to the crank shaft 24 via the connecting rod 23, and thereby the crank shaft 24 rotates. The cylinder 21 and the head of the piston 22 form a combustion chamber 25 along with the cylinder head portion 30.

The cylinder head portion 30 comprises an intake port 31 in communication with the combustion chamber 25, an intake valve 32 for opening and closing the intake port 31, a variable valve train 33 comprising an intake cam shaft for driving the intake valve 32 for continuously changing the phase angle of the intake cam shaft and the maximum lifting heights of the intake valve 32, an actuator 33a for the variable valve train 33, an exhaust port 34 in communication with the combustion chamber 25, an exhaust valve 35 for opening and closing the exhaust port 34, an exhaust cam shaft 36 for driving the exhaust valve 35, an ignition plug 37, an igniter 38 comprising an ignition coil for generating high voltage given to the ignition plug 37, and a fuel injection valve 39 for injecting fuel into the intake port 31 above the intake valve 32.

The intake system 40 comprises an intake pipe 41 comprising an intake manifold respectively connected with the intake ports 31 of the respective cylinders, an air filter 42 disposed at the end of the intake pipe 41, a throttle valve 43 in the intake pipe 41 for varying the intake opening space, and an actuator 43a for the throttle valve 43. The intake ports 31 and the intake manifold 41 constitute an intake channel.

The exhaust system 50 comprises an exhaust manifold 51 respectively connected with the exhaust ports 34 of the respective cylinders, an exhaust pipe 52 connected to a gathering portion of the exhaust manifold 51, a catalyst 53 (three-way catalyst with oxygen occlusion function by means of supported ceria and the like) disposed in the exhaust pipe 52, and a catalyst 54 (three-way catalyst with oxygen occlusion function by means of supported ceria and the like) disposed below the catalyst 53 in the exhaust pipe 52. The exhaust ports 34, the exhaust manifold 51 and the exhaust pipe 52 constitute an exhaust channel.

On the other hand, the internal combustion engine 10 comprises a hot-wire air flow meter 61, a throttle position sensor 62, a cam position sensor 63, a crank position sensor 64, a coolant temperature sensor 65, an upstream air-fuel ratio sensor 66, a downstream air-fuel ratio sensor 67, an accelerator opening sensor 68, and an electric control unit 70.

The air flow meter 61 is configured so as to output a signal corresponding to the mass flow rate (intake air flow rate) Ga of the intake air flowing through the intake pipe 41. The throttle position sensor 62 is configured so as to detect the opening of the throttle valve 43 and output a signal representing the throttle valve opening.

The cam position sensor 63 is configured so as to generate one pulse every time when the intake cam shaft rotates 90° (i.e., every time when the crank shaft 24 rotates 180°). The crank position sensor 64 is configured so as to generate a pulse with barrow width every time when the crank shaft 24 rotates 10° and a pulse with broad width every time when the crank shaft 24 rotates 360°. This signal represents the engine revolution speed NE. The coolant temperature sensor 65 is configured so as to detect the temperature of the coolant of the internal combustion engine and output a signal representing the coolant temperature.

The upstream air-fuel ratio sensor 66 is disposed above the catalyst 53 in the gathering exhaust channel composed of gathered respective exhaust channels extending from respective cylinders. The upstream air-fuel ratio sensor 66 is, for example, the "limiting current-type large area air-fuel ratio sensor comprising a diffusion resistance layer" disclosed in Japanese Patent Application Laid-Open (kokai) No. 11-72473, Japanese Patent Application Laid-Open (kokai) No. 2000-65782, and Japanese Patent Application Laid-Open (kokai) No. 2004-69547.

Figure 2:
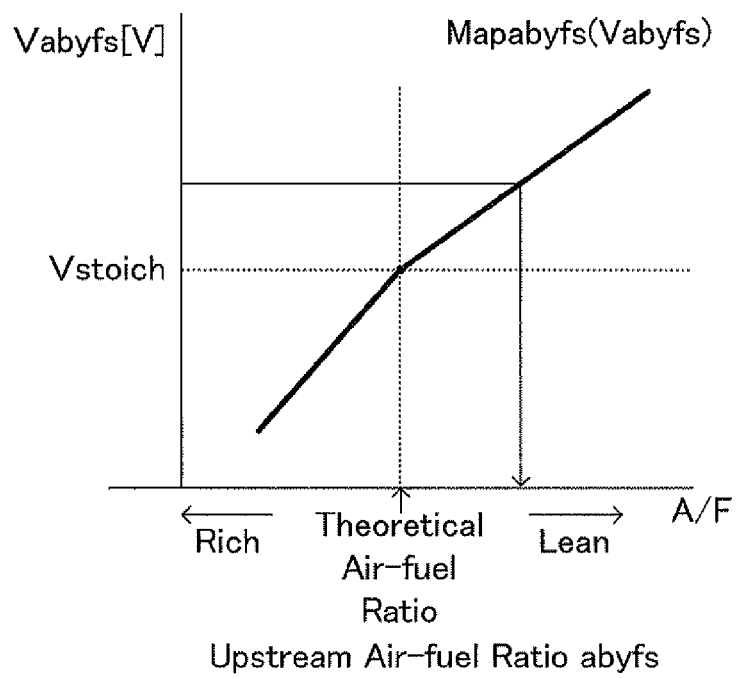
FIG. 2 is a graph showing the relation between the output values of the upstream air-fuel ratio sensor shown in FIG. 1 and the air-fuel ratios.

Hereinafter, the exhaust gas passing through the gathering exhaust channel is referred to as the "mixed exhaust gas." The mixed exhaust gas is the gas obtained by mixing exhaust gases exhausted from respective cylinders. The upstream air-fuel ratio sensor 66 generates an output value Vabyfs (V) corresponding to the air-fuel ratio in the mixed exhaust gas flowing into the catalyst 53. This output value Vabyfs(V) is converted into the air-fuel ratio (hereinafter, referred to as "detected air-fuel ratio") abyfs represented by the output value Vabyfs (V) by utilizing the air-fuel ratio conversion table (map) Mapabyfs shown in FIG. 2.

The downstream air-fuel ratio sensor 67 is disposed below the catalyst 53 and above the catalyst 54 in the gathering exhaust channel. The downstream air-fuel ratio sensor 67 is a well-known electromotive force-type oxygen concentration sensor (well-known concentration cell-type oxygen concentration sensor using stabilized zirconia). The downstream air-fuel ratio sensor 67 generates an output value Voxs (V) corresponding to the air-fuel ratio in the mixed exhaust gas flowing out of the catalyst 53 (accordingly, the time average of the air-fuel ratios in the air-fuel mixture supplied to an engine).

Figure 3:
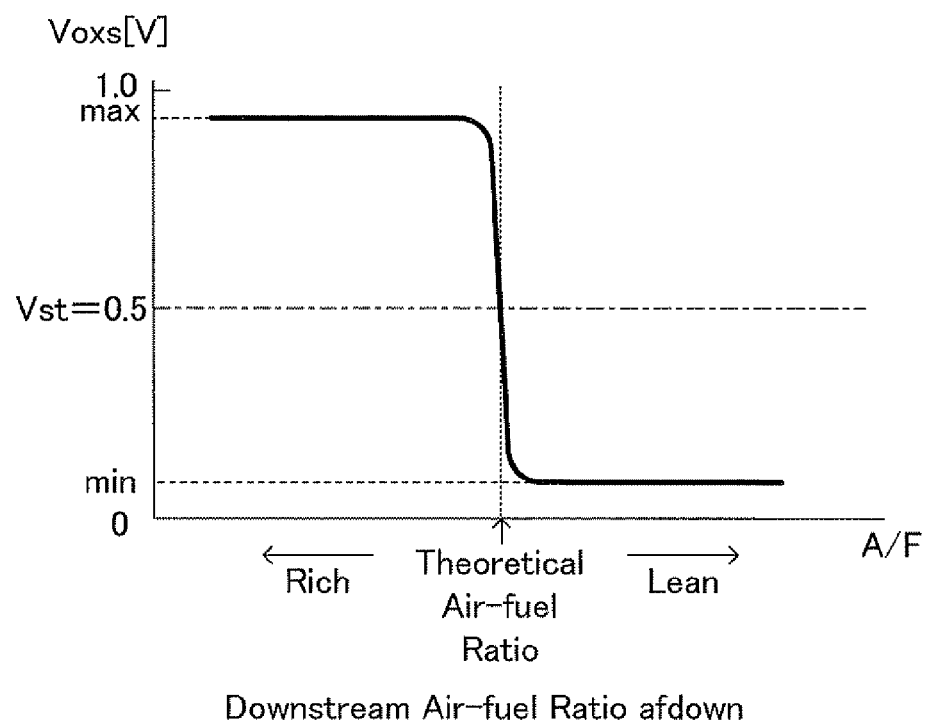
FIG. 3 is a graph showing the relation between the output values of the downstream air-fuel ratio sensor shown in FIG. 1 and the air-fuel ratios.

As shown in FIG. 3, the output value Voxs (V) comes to the maximum output value max (for example, about 0.9 V) when the air-fuel ratio is richer than the theoretical air-fuel ratio, comes to the minimum value min (for example, about 0.1 V) when the air-fuel ratio is leaner than the theoretical air-fuel ratio, and comes to the approximately intermediate value Vst (for example, about 0.5 V) between the maximum output value max and the minimum value min when the air-fuel ratio is the theoretical air-fuel ratio. Further, this output value Voxs rapidly changes from the maximum value max to the minimum value min when the air-fuel ratio changes from an air-fuel ratio richer than the theoretical air-fuel ratio to an air-fuel ratio leaner than the theoretical air-fuel ratio, and rapidly changes from the minimum value min to the maximum value max when the air-fuel ratio changes from an air-fuel ratio leaner than the theoretical air-fuel ratio to an air-fuel ratio richer than the theoretical air-fuel ratio.

Referring to FIG. 1 again, the accelerator opening sensor 68 is configured so as to output a signal representing the operation amount of an accelerator pedal 81 operated by a driver.

The electric control unit 70 is a microcomputer comprising "a CPU 71, a ROM 72 preliminarily memorizing a program executed by the CPU 71, a table (map, function), constants and the like, a RAM 93 in which the CPU 71 temporarily stores data according to need, and a backup RAM 94 for storing data in a power-on state and holding data in a power-off state, as well as an interface 75 comprising an AD converter, and the like" connected with one another through a bus.

The interface 75 is connected with said sensors 61 to 68, and is configured so as to supply the signals from the sensors 61 to 68 to the CPU 71, as well as to deliver signals to the actuator 33a for the variable valve train 33, the igniters 38, the fuel injection valves 39, and the throttle valve actuator 43a.

(Air-Fuel Ratio Feedback Control)

Next, the brief summary of the air-fuel ratio feedback control executed by the present unit will be described. The present unit normally feedback controls the air-fuel ratio in the mixed exhaust gas so as to make it coincide with the theoretical air-fuel ratio, based on the output value Vabyfs of the upstream air-fuel ratio sensor 66 and the output value Voxs of the downstream air-fuel ratio sensor 67.

As one example of the feedback control, the following can be exemplified. Namely, by PID process on the deviation between the output value Voxs of the downstream air-fuel ratio sensor 67 and the target value Vst corresponding to the theoretical air-fuel ratio, a feedback correction value (sub-feedback correction amount) is obtained. By applying the value obtained by correcting the output value Vabyfs of the upstream air-fuel ratio sensor 66 with the sub-feedback correction amount to the air-fuel ratio conversion table Mapabyfs shown in FIG. 2, an apparent air-fuel ratio is obtained. By PID process on the deviation between this apparent air-fuel ratio and the theoretical air-fuel ratio, an air-fuel ratio feedback amount is obtained. This air-fuel ratio feedback amount is a common value to all the cylinders.

Fuel whose amount is obtained by correcting "basic fuel injection amount obtained based on the engine revolution speed NE and the theoretical air-fuel ratio" with the air-fuel ratio feedback amount is respectively injected from the fuel injection valve 39 in each cylinder. Thus, by respectively adjusting the amount of the fuel injected from each fuel injection valve 39 based on the air-fuel ratio feedback amount which is common to all the cylinders, the air-fuel ratio in the mixed exhaust gas is feedback controlled.

(Active Control)

Next, the brief summary of the air-fuel ratio feedback control executed by the present unit will be described. The present unit executes the active control shown in FIG. 4 instead of the above-mentioned air-fuel ratio feedback control, for the purpose of the calculation of the maximum value Cmax of the amount of the oxygen that the catalyst 53 can absorb (the maximum oxygen storage capacity), when a predetermined condition for the active control to be executed is satisfied. The predetermined condition for the active control to be executed is satisfied, for example, when the estimated temperature of the catalyst 53 is a predetermined temperature or higher, and both of (the upstream air-fuel ratio sensor 66) and the downstream air-fuel ratio sensor 67 are normal and activated, and any of the accumulated intake air flow rate after the previous execution of the active control, the accumulated travel distance, the accumulated operating time of the internal combustion engine, and the like reaches a predetermined value.

Figure 4:
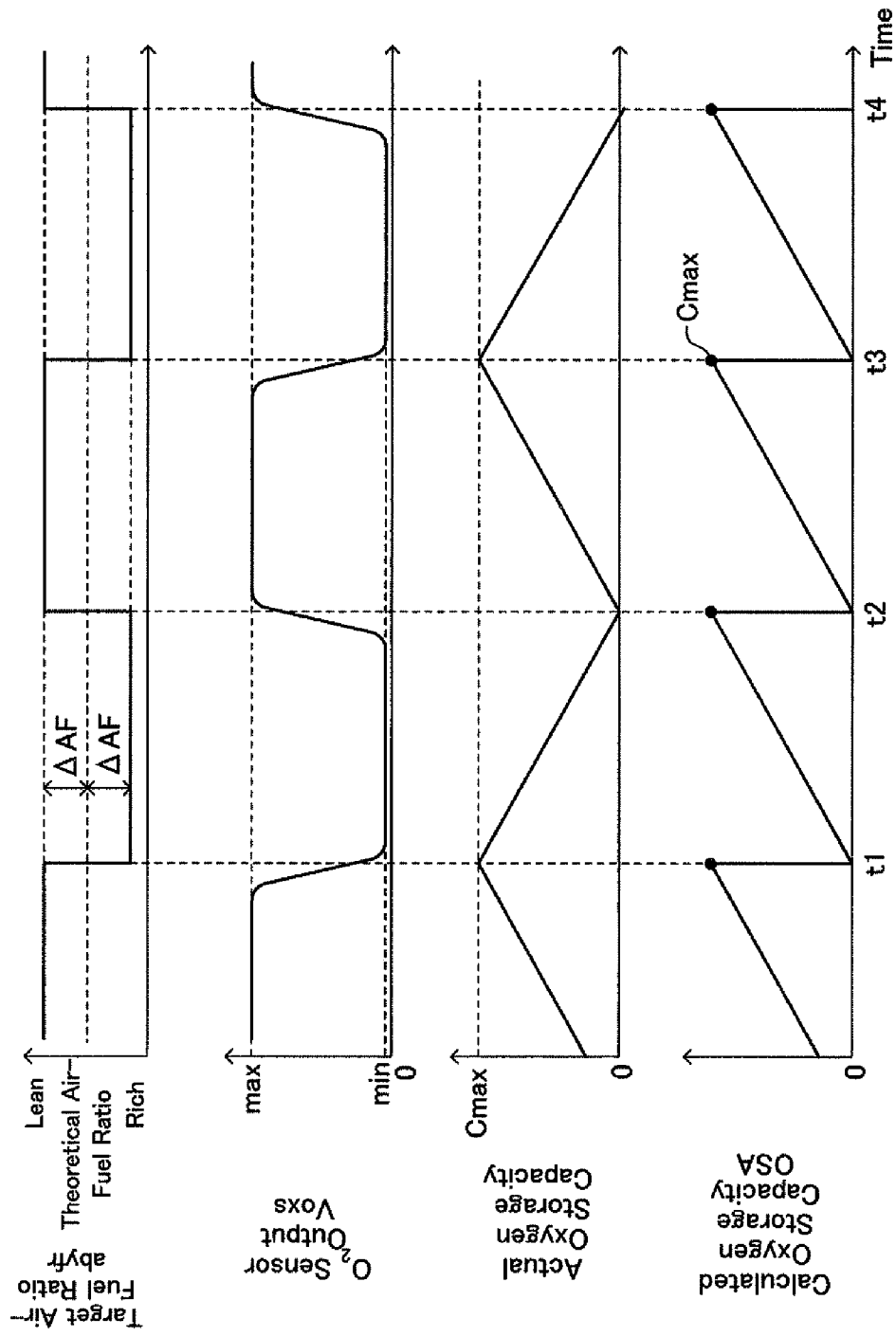
FIG. 4 is a time chart for explaining that the maximum oxygen storage capacity of a three-way catalyst is calculated by the execution of the active control.

As shown in FIG. 4, the active control executed by the present unit is a control to switch the air-fuel ratio above the catalyst 53 (air-fuel ratio above catalyst) from the air-fuel ratio which is an amplitude $\Delta AF$ richer than the theoretical air-fuel ratio (rich air-fuel ratio) to the air-fuel ratio which is an amplitude $\Delta AF$ leaner than the theoretical air-fuel ratio (lean air-fuel ratio) based on the fact that the output value Voxs of the downstream air-fuel ratio sensor 67 (hereinafter, may be referred to simply as a "sensor output value") is inverted from the minimum output value min to the maximum output value max and to switch the air-fuel ratio above catalyst from the lean air-fuel ratio to the rich air-fuel ratio based on the fact that the sensor output value is inverted from the maximum output value max to the minimum output value min. Namely, the air-fuel ratio above catalyst is set alternately at the rich air-fuel ratio and the lean air-fuel ratio periodically.

It is when the actual value of the oxygen storage capacity of the catalyst 53 to be decreasing by the inflow of a large amount of unburned component (HO, CO and the like) into the catalyst 53 arrives at zero and thereby the outflow of a large amount of the unburned component from the catalyst 53 starts, the sensor output value is inverted from the minimum output value min to the maximum output value max during the air-fuel ratio above catalyst is adjusted at the rich air-fuel ratio. On the other hand, It is when the actual value of the oxygen storage capacity of the catalyst 53 to be increasing by the inflow of a large amount of nitrogen oxides (NOx) into the catalyst 53 arrives at the "maximum value Cmax of the amount of the oxygen that the catalyst 53 can absorb (the maximum oxygen storage capacity)" and thereby the outflow of a large amount of nitrogen oxides from the catalyst 53 starts, the sensor output value is inverted from the maximum output value max to the minimum output value min during the air-fuel ratio above catalyst is adjusted at the lean air-fuel ratio.

During the execution of the active control, the calculated oxygen storage capacity OSA of the catalyst 53 is increased (accumulated) from zero every time when the air-fuel ratio above catalyst is switched. The increase gradient of the oxygen storage capacity OSA is proportional to the intake air flow rate Ga and the amplitude $\Delta AF$. In addition, the oxygen storage capacity OSA which has been accumulated up to that point is acquired as the maximum oxygen storage capacity Cmax of the catalyst 53.

Namely, the maximum oxygen storage capacity Cmax acquired every time when the air-fuel ratio above catalyst is switched by the execution of the active control is proportional to each of the intake air flow rate Ga, the amplitude $\Delta AF$, and the fluctuation cycle of the air-fuel ratio above catalyst. The detail of the technique for thus acquiring the maximum oxygen storage capacity Cmax by the execution of the active control is described, for example, in Japanese Patent Application Laid-Open (kokai) No. 2009-127597 and the like. In the present unit, the ultimate oxygen storage capacity Cmax of the catalyst 53 is acquired, for example, by averaging the multiple maximum oxygen storage capacities obtained by the execution of the active control and so on.

(Principle of Acquiring Responsibility of Downstream Air-Fuel Ratio Sensor)

Due to the degradation of the downstream air-fuel ratio sensor 67, the responsibility of the downstream air-fuel ratio sensor 67 may decrease (the delay in response may increase). When the responsibility of the downstream air-fuel ratio sensor 67 decreases, the time period required for the sensor output value to be inverted from the minimum output value min to the maximum output value max (or conversely) becomes longer. As the result of this, the fluctuation cycle of the air-fuel ratio above catalyst during the execution of the active control becomes longer. As the result of this, a situation where the maximum oxygen storage capacity Cmax of the catalyst 53 acquired by the execution of the active control is calculated to be larger than its actual amount can occur. Therefore, in order to accurately calculate the maximum oxygen storage capacity of the catalyst 53, it is necessary to acquire the responsibility of the downstream air-fuel ratio sensor 67. Hereinafter, the principle of acquiring the responsibility of the downstream air-fuel ratio sensor 67 will be described.

Figure 5:
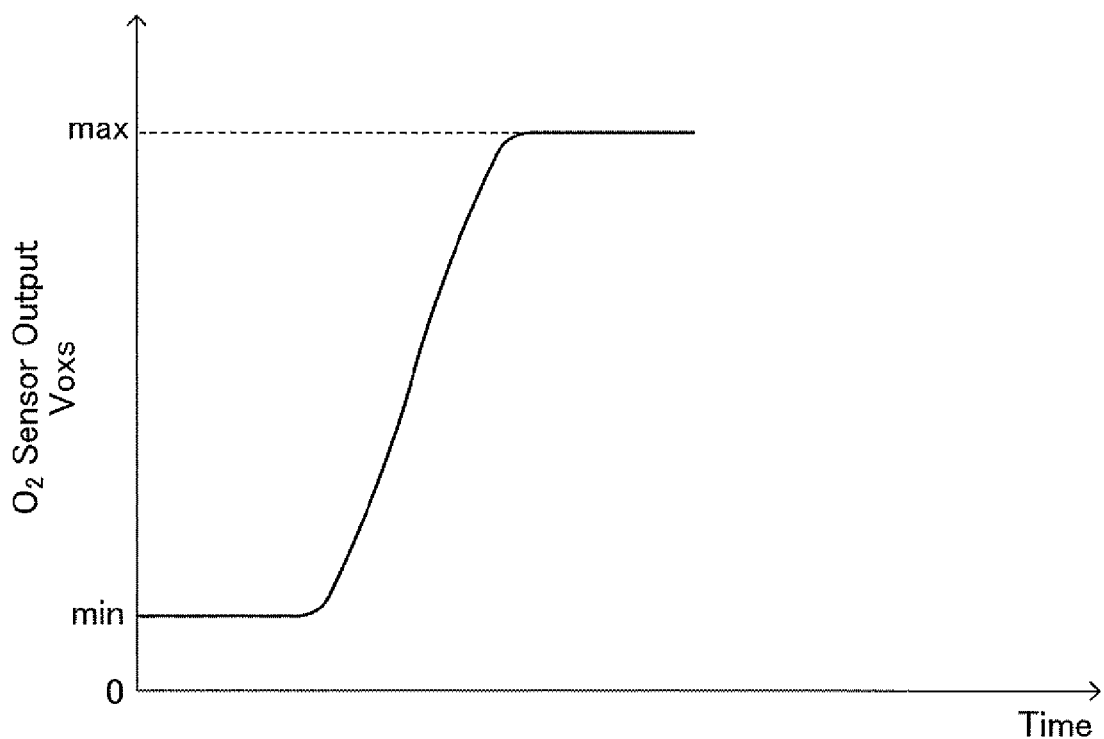
FIG. 5 is a graph showing an example of the fluctuation of said output value when the output value of the downstream air-fuel ratio sensor is inverted from the minimum value corresponding to the lean air-fuel ratio to the maximum value corresponding to the rich air-fuel ratio.
Figure 6:
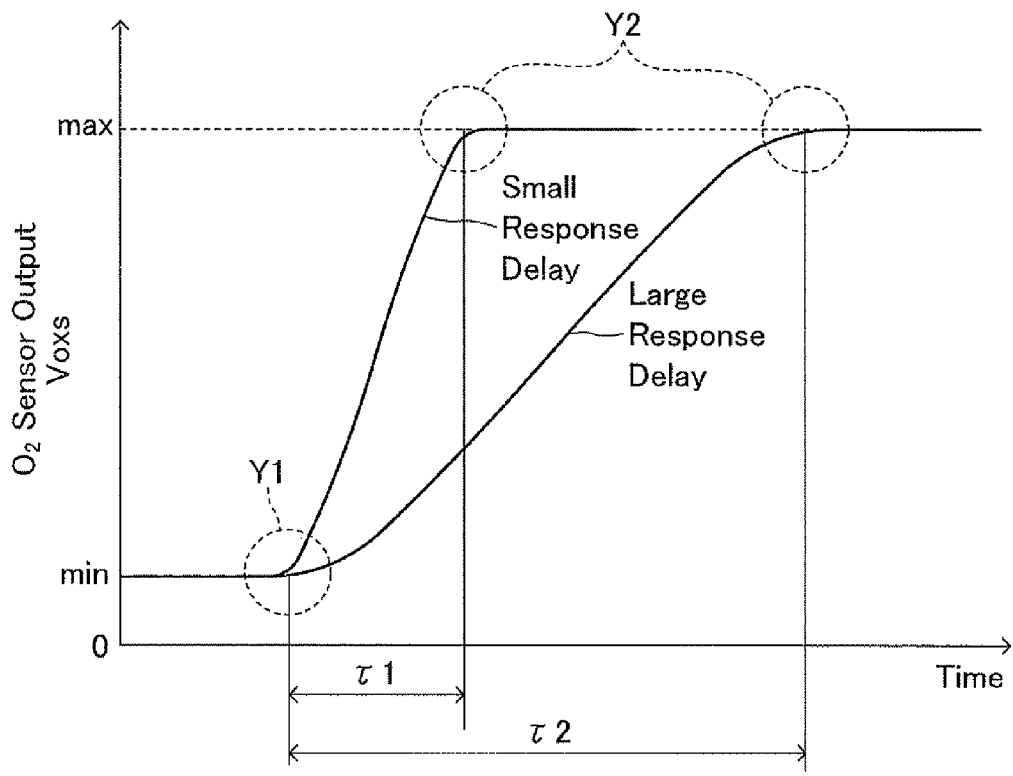
FIG. 6 is a graph showing the fluctuation of the output value when the output value of the downstream air-fuel ratio sensor is inverted from the minimum value to the maximum value, comparing that in the case where the delay in response of the downstream air-fuel ratio sensor is large with that in the case where the delay in response is small.

First, as shown in FIG. 5, the transition (waveform) of the sensor output value in the process in which the sensor output value is inverted from the minimum output value min to the maximum output value max during the execution of the above-mentioned active control is extracted. When the degree of the degradation of the catalyst 53 is identical, as shown in FIG. 6, the transition (waveform) of the sensor output value in the case where the responsibility of the downstream air-fuel ratio sensor 67 is low (the delay in response is large) is different from that in the case where the responsibility of the downstream air-fuel ratio sensor 67 is high (the delay in response is small). Herein, the case where the delay in response is small (in case of "small response delay") corresponds to, for example, the case where the downstream air-fuel ratio sensor 67 is brand-new, and the case where the delay in response is large (in case of "large response delay") corresponds to, for example, the case where the downstream air-fuel ratio sensor 67 has been deteriorated.

In the present unit, as an index for representing the responsibility, the "time constant" used for evaluating the responsibility of the first-order lag system to step input is adopted. In case of "small response delay," the time constant ($\tau 1$) is small, and in case of "large response delay," the time constant ($\tau 2$) is large ($\tau 1 < \tau 2$).

In the waveform of the sensor output value shown in FIG. 6, especially, the region where the increase in the output value starts (refer to the Y1 region) and the region where the increase in the output value ends (refer to the Y2 region) are focused. As can be understood from FIG. 6, in case of "small response delay," the gradient of the sensor output value rapidly changes in the Y1 region and the Y2 region. On the other hand, in case of "large response delay," the gradient of the sensor output value moderately changes in the Y1 region and the Y2 region.

The above means that for both of the peak value (local maximum value) of the secondary differential value with respect to time of the sensor output value in the Y1 region and the peak value (local minimum value) of the secondary differential value with respect to time of the sensor output value in the Y2 region, those in case of "large response delay" are smaller than those in case of "small response delay." Hereinafter, the "local minimum value" shall mean the "absolute value of the local minimum value." Namely, "the local minimum value is large (small)" shall mean "the absolute value of the local minimum value is large (small)."

Figure 7:
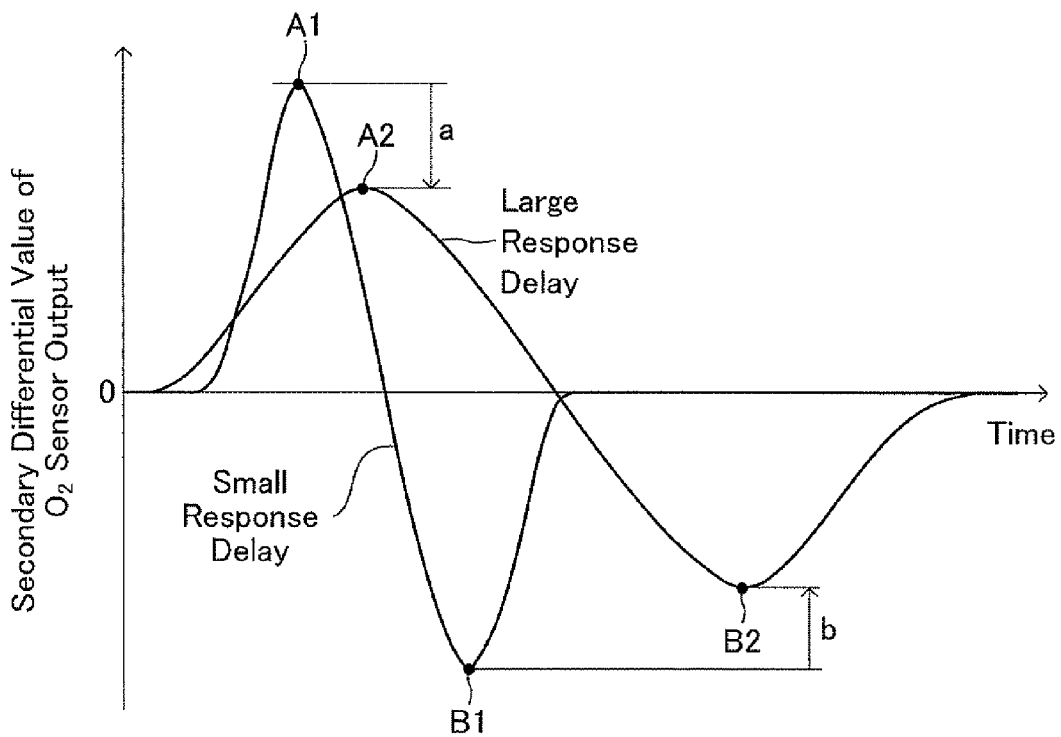
FIG. 7 is a graph showing the transition of the secondary differential values with respect to time of the transitions of the respective output values of the downstream air-fuel ratio sensor shown in FIG. 6.

FIG. 7 shows the transition of the secondary differential values with respect to time of the transitions of the sensor output values shown in FIG. 6. The following matter can be understood from FIG. 7. First, the local maximum value A1 in case of "small response delay" is larger than the local maximum value A2 in case of "large response delay." Similarly, the local minimum value B1 in case of "small response delay" is larger than the local minimum value B2 in case of "large response delay." In addition, the decrement b of the local minimum value on change from "small response delay" to "large response delay" is smaller than the decrement a of the local maximum value on change from "small response delay" to "large response delay."

Namely, with respect to the process in which the sensor output value is inverted from the minimum output value min to the maximum output value max during the execution of the active control, when the degree of the degradation of the catalyst 53 is identical, the more the responsibility of the downstream air-fuel ratio sensor 67 decreases (the more the delay in response increases), the more the local maximum and minimum values of the secondary differential value of the sensor output value decreases. In this case, the decrement in the local minimum value due to the progression of the decrease in the responsibility of the downstream air-fuel ratio sensor 67 (increase in the response delay) is smaller than the decrement in the local maximum value due to the progression of the decrease in the responsibility of the downstream air-fuel ratio sensor 67 (increase in the response delay).

Figure 8:
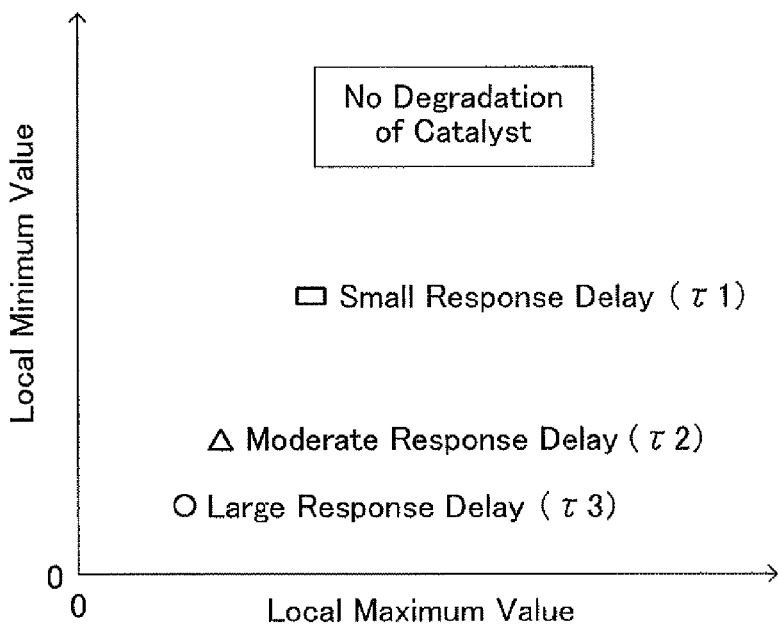
FIG. 8 is a graph showing the relation between the delay in response of the downstream air-fuel ratio sensor and the local maximum and minimum values in the secondary differential values of the output values of the upstream air-fuel ratio sensor when the output value of the downstream air-fuel ratio sensor is inverted from the minimum value to the maximum value, in the case where there is no degradation of the three-way catalyst.

Next, the relation between the degree of the degradation of the catalyst 53 and the local maximum and minimum values of the secondary differential value of the sensor output value will be discussed. FIG. 8 shows one example of the relation between the delay in response of the downstream air-fuel ratio sensor 67 and the local maximum and minimum values obtained through the experiment and the like with respect to the case where there is no degradation of the catalyst 53. In FIG. 8, as the "delay in responsibility" of the downstream air-fuel ratio sensor 67, three classes of "small response delay" ($\tau 1$), "moderate response delay" ($\tau 2$), and "large response delay" ($\tau 3$) are shown ($\tau 1 < \tau 2 < \tau 3$). For example, the "small response delay" corresponds to the case where the downstream air-fuel ratio sensor 67 is brand-new, the "moderate response delay" ($\tau 2$) corresponds to the case where the downstream air-fuel ratio sensor 67 is that after the end of a medium-term endurance test, and the "large response delay" corresponds to the case where the downstream air-fuel ratio sensor 67 is that after the end of a long-term endurance test.

Figure 9:
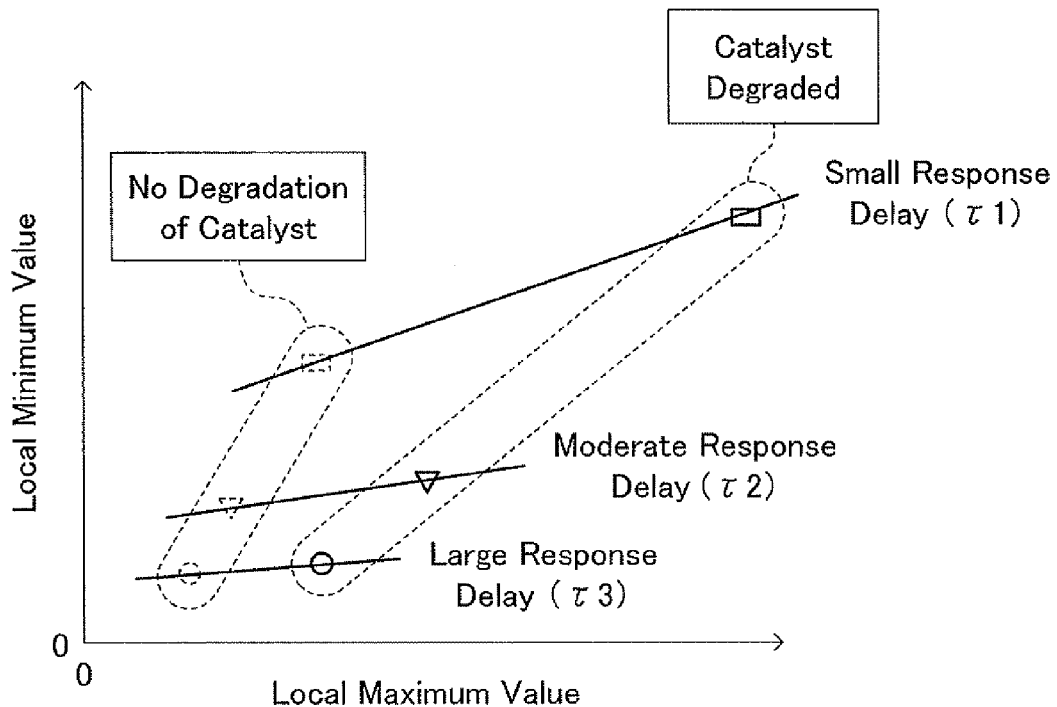
FIG. 9 is a graph showing the relation between the delay in response of the downstream air-fuel ratio sensor and the local maximum and minimum values in the secondary differential values of the output values of the upstream air-fuel ratio sensor when the output value of the downstream air-fuel ratio sensor is inverted from the minimum value to the maximum value, comparing that in the case where there is degradation of the three-way catalyst with that in the case where there is no degradation of the three-way catalyst.

On the contrary, FIG. 9 shows one example of the relation between the delay in response of the downstream air-fuel ratio sensor 67 and the local maximum and minimum values obtained through the experiment and the like with respect to the case where there is degradation of the catalyst 53, comparing with the result shown in FIG. 8 (refer to the plot line represented by broken line).

The following matter can be understood from FIG. 9. When the delay in the responsibility of the downstream air-fuel ratio sensor 67 is identical, the more the degradation of the catalyst 53 progresses, the more the local maximum and minimum values of the secondary differential value of the sensor output value increase. In this case, the increment in the local maximum value due to the progression of the degradation of the catalyst 53 is smaller than the increment in the local minimum value due to the progression of the degradation of the catalyst 53.

It is conceived that the fact that the more the degradation of the catalyst 53 progresses, the more the local maximum and minimum values increases is based on that when the degradation of the catalyst 53 progresses, the "function to suppress rapid change in the air-fuel ratio in the exhaust gas flowing out of the catalyst 53" obtained by the oxygen occlusion function of the catalyst 53 becomes unlikely to affect, and the air-fuel ratio in the exhaust gas flowing out of the catalyst 53 becomes to more rapidly change.

As the above, with respect to the process in which the sensor output value is inverted from the minimum output value min to the maximum output value max during the execution of the active control, the local maximum and minimum values of the secondary differential value of the sensor output value is widely affected by the size of the response delay of the downstream air-fuel ratio sensor 67 and the size of the degree of the degradation of the catalyst 53. Accordingly, by preliminarily acquiring and memorizing these relations and applying the "local maximum and minimum values of the secondary differential value of the sensor output value" to the memorized relations, the response delay of the downstream air-fuel ratio sensor 67 (time constant) can be obtained. The above is the brief summary of the principle of acquiring the responsibility of the downstream air-fuel ratio sensor 67.

(Method for Acquiring Responsibility of Downstream Air-Fuel Ratio Sensor)

Next, a specific method for acquiring the responsibility of the downstream air-fuel ratio sensor 67 will be described. First, through the experiment and the like, the data of the transition of the sensor output value with respect to the process in which the sensor output value is inverted from the minimum output value min to the maximum output value max during the execution of the active control is respectively obtained by variously changing the combination of the response delay of the downstream air-fuel ratio sensor 67 and the degradation degree of the catalyst 53. Specifically, the data of the transition of the sensor output is composed of the data group of the sensor output values obtained at an every predetermined sampling period.

Herein, these data can be acquired by actually preparing and using plural kinds of downstream air-fuel ratio sensors with different response delays. The data for a downstream air-fuel ratio sensor with large response delay may be acquired by subjecting the sensor output value of a (for example, brand-new) downstream air-fuel ratio sensor with small response delay to a first-order lag treatment.

Figure 10:
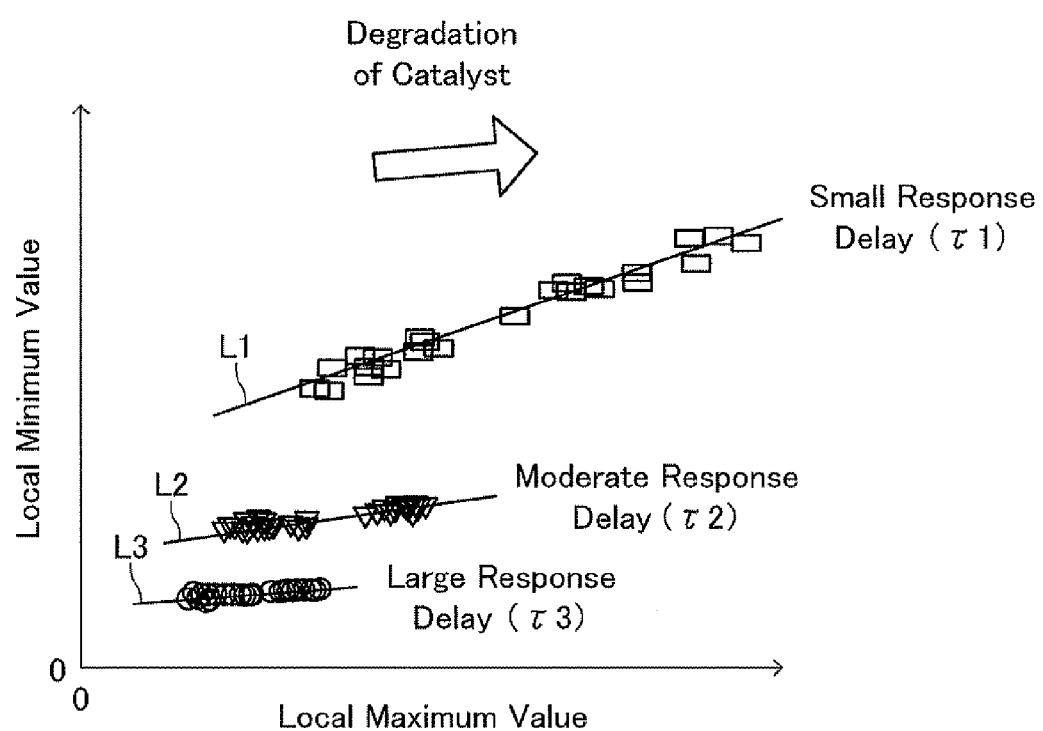
FIG. 10 is a graph showing a map defining the relation between the delay in response of the downstream air-fuel ratio sensor and the local maximum and minimum values in the secondary differential values of the output values of the upstream air-fuel ratio sensor when the output value of the downstream air-fuel ratio sensor is inverted from the minimum value to the maximum value, for each of many cases where the degrees of degradation of the three-way catalyst are different.

Each of the multiple data obtained as described above is subjected to secondary differential treatment with respect to time, and the local maximum and minimum values are calculated. FIG. 10 shows one example of the relation between the size of the response delay of the downstream air-fuel ratio sensor (time constant) and the local maximum and minimum values obtained for each of many catalysts with different degradation degree. In FIG. 10, as the "delay in responsibility" of the downstream air-fuel ratio sensor, three classes of "small response delay" ($\tau 1$), "moderate response delay" ($\tau 2$), and "large response delay" ($\tau 3$) are used ($\tau 1 < \tau 2 < \tau 3$). For example, the "small response delay" corresponds to the case where the downstream air-fuel ratio sensor 67 is brand-new, the "moderate response delay" ($\tau 2$) corresponds to the case where the downstream air-fuel ratio sensor 67 is that after the end of a medium-term endurance test, and the "large response delay" corresponds to the case where the downstream air-fuel ratio sensor 67 is that after the end of a long-term endurance test.

In the map shown in FIG. 10, the plot point group existing adjacent the line L1 corresponds to the case of the "small response delay" ($\tau 1$), the plot point group existing adjacent the line L2 corresponds to the case of the "moderate response delay" ($\tau 2$), and the plot point group existing adjacent the line L3 corresponds to the case of the "large response delay" ($\tau 3$). In the plot point groups existing adjacent the respective lines, as the degradation of the catalyst progresses, the corresponding local maximum value (and the local minimum value) increase.

The present unit memorizes (stores), in the ROM 72 or the like, the map defining the "relation between the response delay of the downstream air-fuel ratio sensor and the local maximum and minimum values for each of many catalysts with different degradation degrees.

The present unit calculates the "local maximum and minimum values of the secondary differential value of the sensor output value" from the data of the transition of the actual sensor output value obtained with respect to the process in which the sensor output value is inverted from the minimum output value min to the maximum output value max. On the calculation of the local maximum and minimum values, it is suitable that the operating condition of the internal combustion engine under execution of the active control (such as) coincides with the operating condition of the internal combustion engine under execution of the active control related to the preparation of the map shown in FIG. 10. When the state that the air-fuel ratio above catalyst is changed in the same manner as the active control exists, the "local maximum and minimum values of the secondary differential value on the sensor output value" may be calculated from the data of the transition of the actual sensor output value obtained in the state.

The present unit acquires the response delay of the downstream air-fuel ratio sensor (time constant) by applying the calculated local maximum and minimum values to the map shown in FIG. 10. At that time, when (the points corresponding to) the combination of the calculated local maximum and minimum values are on or adjacent any of the lines L1, L2, and L3, the present unit acquires, as the response delay of the downstream air-fuel ratio sensor (time constant), the response delay (any of $\tau 1$, $\tau 2$, $\tau 3$) corresponding to the line.

On the other hand, when (the points corresponding to) the combination of the calculated local maximum and minimum values are neither on nor adjacent any of the lines L1, L2, and L3, the present unit acquires the response delay of the downstream air-fuel ratio sensor (time constant) by using well-known technique such as interpolation, based on (the points corresponding to) the combination and the positional relation with the lines L1, L2, and L3.

(Accuracy Improvement of Acquired Response Delay of Downstream Air-Fuel Ratio Sensor)

Hereinafter, a technique for improving the accuracy of the response delay of the downstream air-fuel ratio sensor acquired by the present unit will be described.

<Technique 1>

Figure 11:
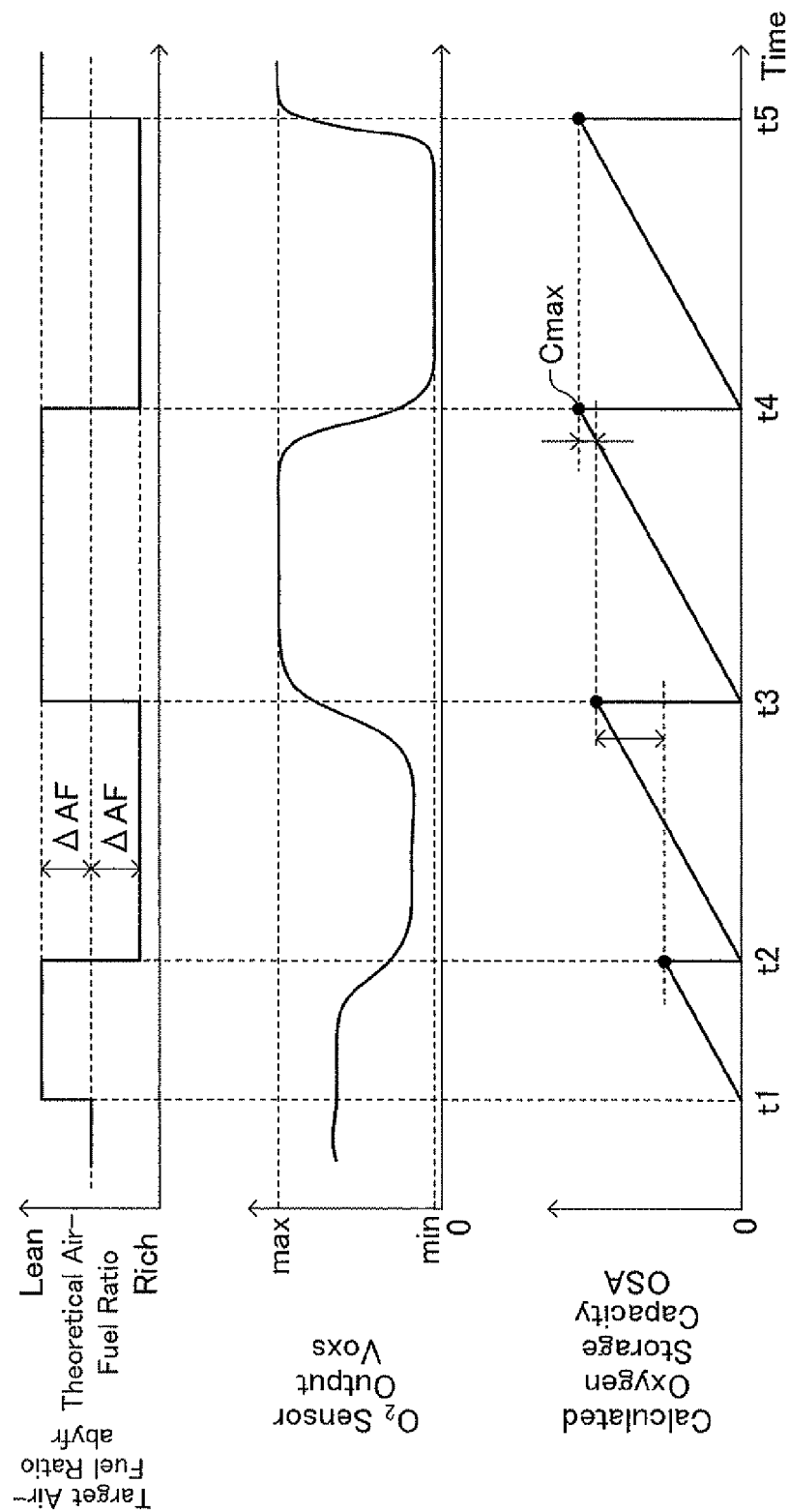
FIG. 11 is a time chart for explaining that, at the stage where enough time has not yet passed since the start of the active control, the fluctuation pattern (waveform) of the air-fuel ratio in the exhaust gas flowing out from the three-way catalyst is likely to vary, i.e., the value of the calculated maximum oxygen storage capacity is likely to vary.

As shown in FIG. 11, at the stage where enough time has not yet passed since the active control was started at time t1 (at the stage where the number of switching of the air-fuel ratio above catalyst is still low), the waveform of the sensor output value Voxs. It is conceived that the fluctuation pattern (waveform) of the air-fuel ratio in the exhaust gas flowing out from the catalyst 53 is likely to vary due to the surviving influence of the oxygen storage state of the catalyst 53 just before the start of the active control and the like.

As the result of the above, the local maximum and minimum values of the secondary differential value calculated from the waveform of the sensor output value at this stage. In other words, said first and second extrema are difficult to be values accurately representing the response delay of the downstream air-fuel ratio sensor 67. In addition, due to the fact that the fluctuation cycle of the air-fuel ratio above catalyst is likely to vary, the calculated value of the maximum oxygen storage capacity Cmax is also likely to vary.

On the other hand, after enough time has passed since the start of the active control (after the number of switching of the air-fuel ratio above catalyst has come to enough high), the influence of the oxygen storage state of the catalyst 53 just before the start of the active control and the like disappears and the fluctuation pattern (waveform) of the air-fuel ratio in the exhaust gas flowing out from the catalyst 53 is likely to become stable. Namely, said first and second extrema can become stable values accurately representing the response delay of the downstream air-fuel ratio sensor. In addition, due to the fact that the fluctuation cycle of the air-fuel ratio above catalyst becomes stable, the difference (ratio) between the previous value and the current value of the calculated maximum oxygen storage capacity Cmax decreases (the calculated individual maximum oxygen storage capacity becomes stable).

From the above, it is preferred that, after the start of the active control, said local maximum and minimum values are calculated from the waveform of the sensor output value obtained in the condition where it is judged that "the degree of the discrepancy between the previous value and the current value of the calculated maximum oxygen storage capacity Cmax is small." Thereby, as compared with the case where said local maximum and minimum values are calculated from the waveform of the sensor output value obtained at the stage where enough time has not yet passed since the start of the active control (at the stage where the number of switching of the air-fuel ratio above catalyst is still low), the response delay of the downstream air-fuel ratio sensor can be accurately acquired.

x judged that "the degree of the discrepancy between the previous value and the current value of the calculated maximum oxygen storage capacity Cmax is small," specifically, for example, the case where any of the conditions shown in the following Example 1 to Example 4 is satisfied, wherein C1 is the previous value, and C2 is the current value.

$-0.1 \leq (C2-C1) \leq 0.1$      Example 1:

$0.9 \leq (C2/C1) \leq 1.1$      Example 2:

$-(C1 \times 0.1) \leq (C2-C1) \leq (C1 \times 0.1)$      Example 3:

$-(C2 \times 0.1) \leq (C2-C1) \leq (C2 \times 0.1)$      Example 4:

Alternatively, as the case where it is judged that "the degree of the discrepancy between the previous value and the current value of the calculated maximum oxygen storage capacity Cmax is small," the case where the number of switching of the air-fuel ratio above catalyst since the start of the active control has reached a prescribed value can be adopted. This prescribed value can be defined by preliminarily acquiring the number of switching of the air-fuel ratio above catalyst required before any of the conditions in the above-mentioned Example 1 to Example 4 is achieved for the first time, through the experiment and the like.

<Technique 2>

Generally, for certain downstream air-fuel ratio sensors (with same degradation degree), the more the amount of the exhaust gas flowing through the exhaust channel (i.e., intake air flow rate Ga) becomes, the more the response delay of the downstream air-fuel ratio sensor apparently decreases. It is conceived that this is based on that the more the flow rate of the exhaust gas flowing through the exhaust channel, the sensitivity of t downstream air-fuel ratio sensor is apparently improved. Namely, when the degradation degree of the downstream air-fuel ratio sensor and the degradation degree of the catalyst are same, the local maximum and minimum values of the secondary differential value of the sensor output value are affected by the intake air flow rate Ga.

In light of the above, it is preferred to correct the calculated response delay (time constant) of the downstream air-fuel ratio sensor based on the intake air flow rate Ga. By thus correcting, regardless of the intake air flow rate, the response delay (time constant) of the downstream air-fuel ratio sensor can be stably and accurately acquired.

Figure 12:
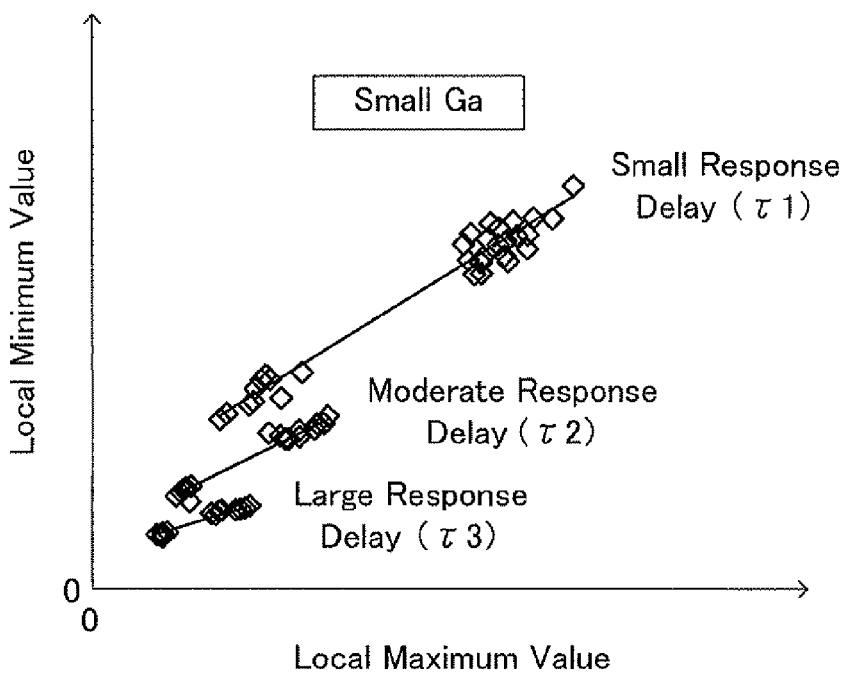
FIG. 12 is a graph showing an example of the map shown in FIG. 10 when the flow rate of the intake air is small.
Figure 13:
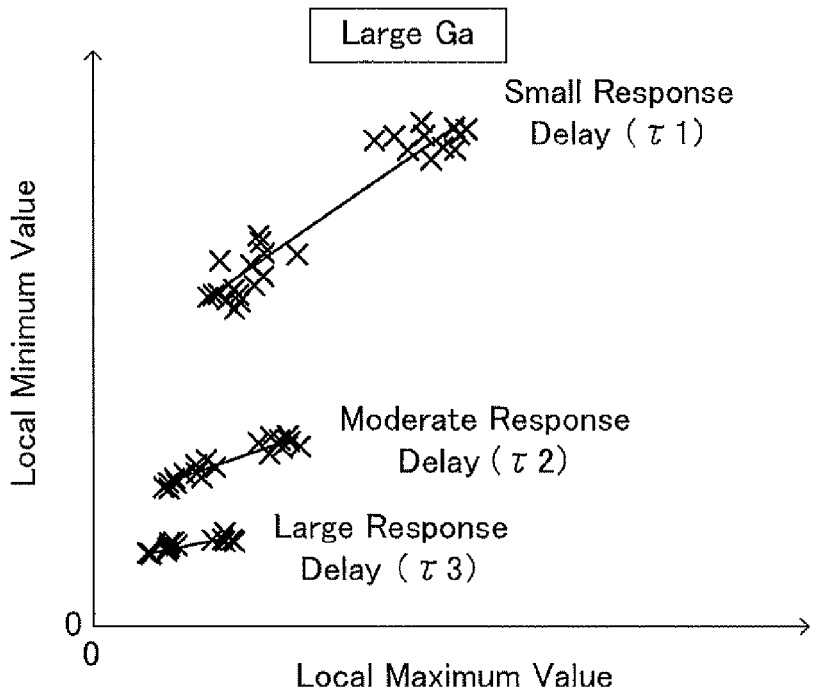
FIG. 13 is a graph showing an example of the map shown in FIG. 10 when the flow rate of the intake air is large.

As the specific technique for the above correction, the following can be exemplified. For example, as shown in FIG. 12 and FIG. 13, for each of multiple cases with different intake air flow rates Ga's, a map corresponding to the map shown in the above-mentioned FIG. 10 is prepared. By applying the local maximum and minimum values calculated as mentioned above to respective maps (for example, the respective maps shown in FIG. 12 and FIG. 13), the response delays (time constants) of the downstream air-fuel ratio sensor corresponding to respective intake air flow rates are respectively acquired. Then, based on the magnitude relation between the respective intake air flow rates corresponding to respective maps and the intake air flow rate when the waveform of the sensor output value for calculating said local maximum and minimum values is obtained (hereinafter, referred to as "intake air flow rate on acquisition"), by using a well-known technique such as interpolation, from said acquired respective response delays (time constants), the response delay of the downstream air-fuel ratio sensor corresponding to the intake air flow rate on acquisition is acquired.

Alternatively, when the relation between said local maximum and minimum values and the intake air flow rate can be defined as a function, based on this function and the acquired local maximum and minimum values, the corrected local maximum and minimum values corresponding to the intake air flow rate on acquisition is obtained, and by applying these corrected local maximum and minimum values to the map shown in FIG. 10, the response delay of the downstream air-fuel ratio sensor corresponding to the intake air flow rate on acquisition is acquired.

<Technique 3>

Generally, for certain downstream air-fuel ratio sensors (with same degradation degree), the larger the amplitude $\Delta AF$ in the active control becomes, the more rapidly the gradient of the sensor output value changes in the Y1 region and the Y2 region of the waveform of the sensor output value shown in FIG. 6. It is conceived that this is based on that the larger the amplitude $\Delta AF$ becomes, the more rapidly the actual air-fuel ratio in the exhaust gas flowing out of the catalyst 53 changes. Namely, when the degradation degree of the downstream air-fuel ratio sensor and the degradation degree of the catalyst are same, the local maximum and minimum values of the secondary differential value of the sensor output value are affected by the amplitude $\Delta AF$ of the active control.

In light of the above, it is preferred to calculate the response delays (time constants) of the downstream air-fuel ratio sensor for respective multiple types of active controls with different amplitudes $\Delta AF$'s and acquire the ultimate response delay (time constant) of the downstream air-fuel ratio sensor based on the respective calculated response delays (time constants) of the downstream air-fuel ratio sensor. Thereby, as compared with the case where the response delay (time constant) of the downstream air-fuel ratio sensor is base on the execution of active control with only one type of amplitude $\Delta AF$, the response delay (time constant) of the downstream air-fuel ratio sensor can be furthermore accurately acquired.

Figure 14:
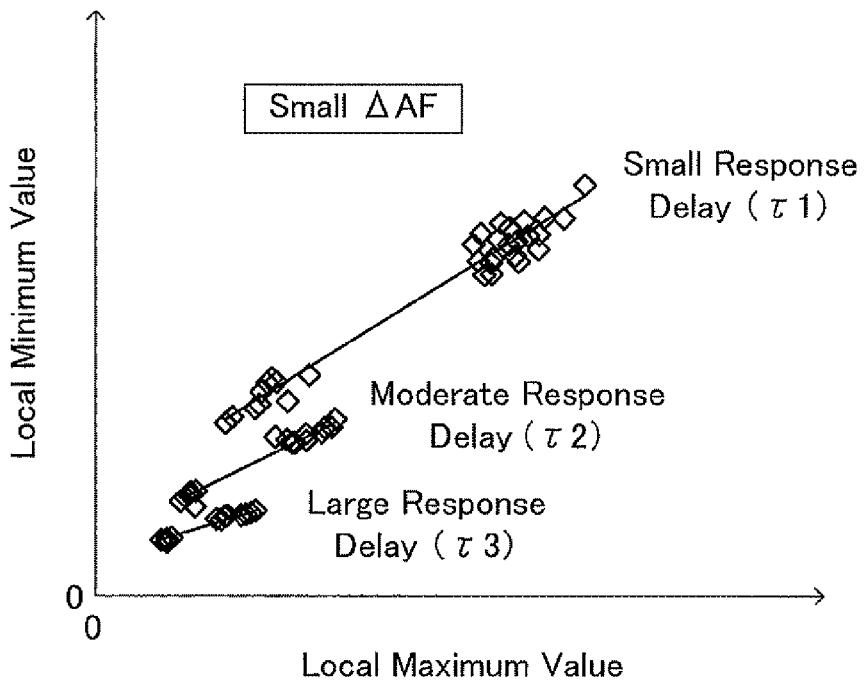
FIG. 14 is a graph showing an example of the map shown in FIG. 10 when the amplitude of the air-fuel ratio in the active control is small.
Figure 15:
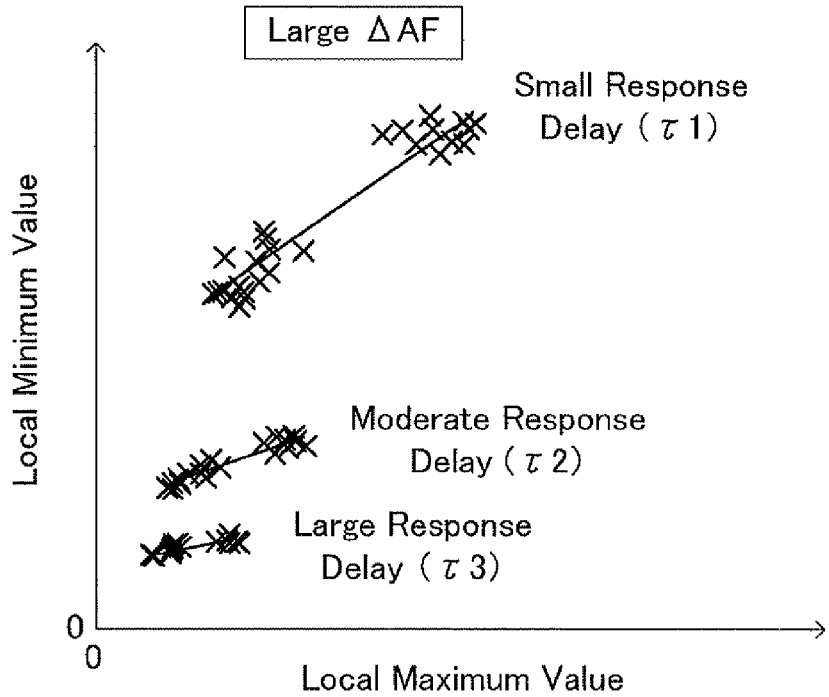
FIG. 15 is a graph showing an example of the map shown in FIG. 10 when the amplitude of the air-fuel ratio in the active control is large.

As the specific technique for the above correction, the following can be exemplified. For example, as shown in FIG. 14 and FIG. 15, for each of multiple types of active controls with different amplitudes $\Delta AF$'s, a map corresponding to the map shown in the above-mentioned FIG. 10 is prepared. By applying the local maximum and minimum values calculated as mentioned above to respective maps (for example, the respective maps shown in FIG. 14 and FIG. 15), the response delays (time constants) of the downstream air-fuel ratio sensor corresponding to respective amplitudes $\Delta AF$'s are respectively acquired. Then, by averaging said respective acquired response delays (time constants) or the like, the ultimate response delay (time constant) of the downstream air-fuel ratio sensor is acquired.

In this case, when the difference among said acquired respective response delays (time constants) is large, the possibility that the acquired ultimate response delay of the downstream air-fuel ratio sensor would contain a large error is high. Accordingly, in this case, it is desirable to perform the above-mentioned processing again, confirm that the difference among said acquired respective response delays (time constants) is small, and thereafter acquire the ultimate response delay (time constant) of the downstream air-fuel ratio sensor based on said acquired respective response delays (time constants).

(Action And Effect)

As the above, in accordance with the embodiment according to the present invention, the fact that "with respect to the process in which the output value of the downstream air-fuel ratio sensor (sensor output value) is inverted from the minimum output value min to the maximum output value max during the execution of the active control, the local maximum and minimum values of the secondary differential value of the sensor output value is widely affected by the size of the response delay of the downstream air-fuel ratio sensor 67 and the size of the degree of the degradation of the catalyst 53" is utilized. Namely, by preliminarily acquiring and memorizing these relations as maps as shown in FIG. 10 and applying the "local maximum and minimum values of the secondary differential value of the sensor output value" calculated from the transition of the sensor output value acquired during the execution of the active control to the maps, the response delay of the downstream air-fuel ratio sensor 67 (time constant) is acquired.

Figure 16:
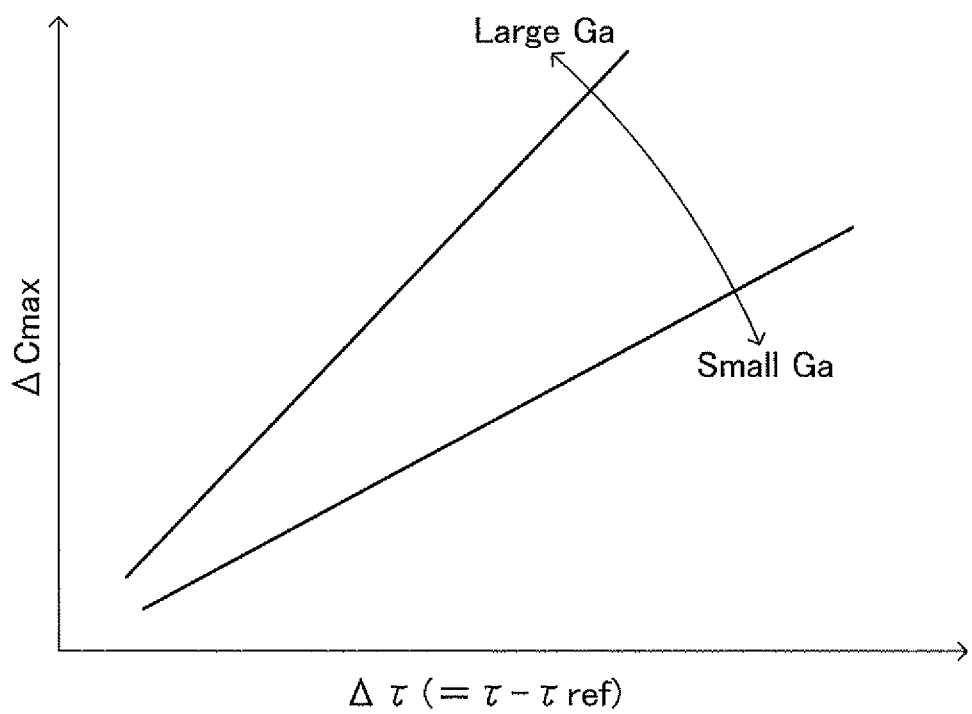
FIG. 16 is a graph showing the relation between the deviation of time constant and the correction amount of the maximum oxygen storage capacity.
Figure 17:
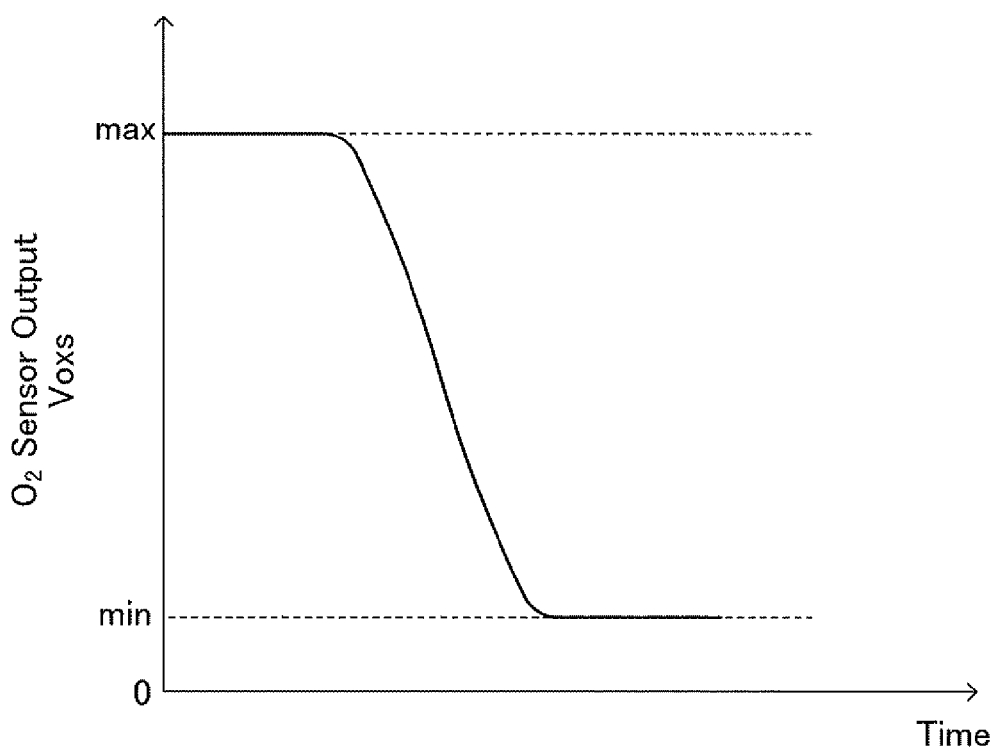
FIG. 17 is a graph showing an example of the fluctuation of said output value when the output value of the downstream air-fuel ratio sensor is inverted from the maximum value corresponding to the rich air-fuel ratio to the minimum value corresponding to the lean air-fuel ratio.
Figure 18:
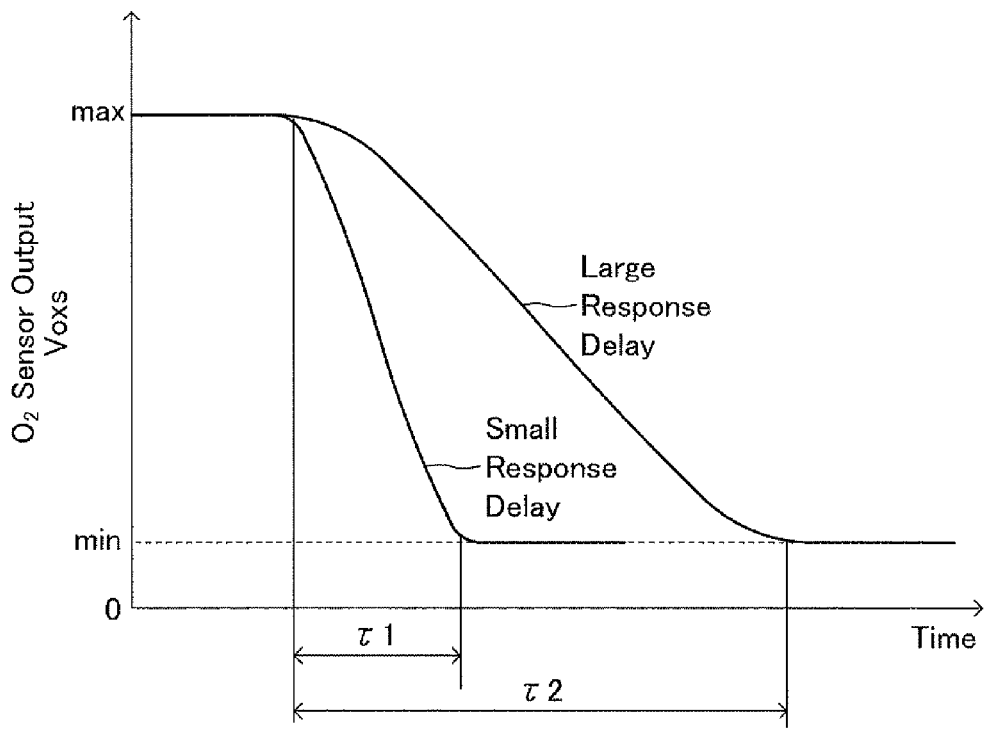
FIG. 18 is a graph showing the fluctuation of the output value when the output value of the downstream air-fuel ratio sensor is inverted from the maximum value to the minimum value, comparing that in the case where the delay in response of the downstream air-fuel ratio sensor is large with that in the case where the delay in response is small.
Figure 19:
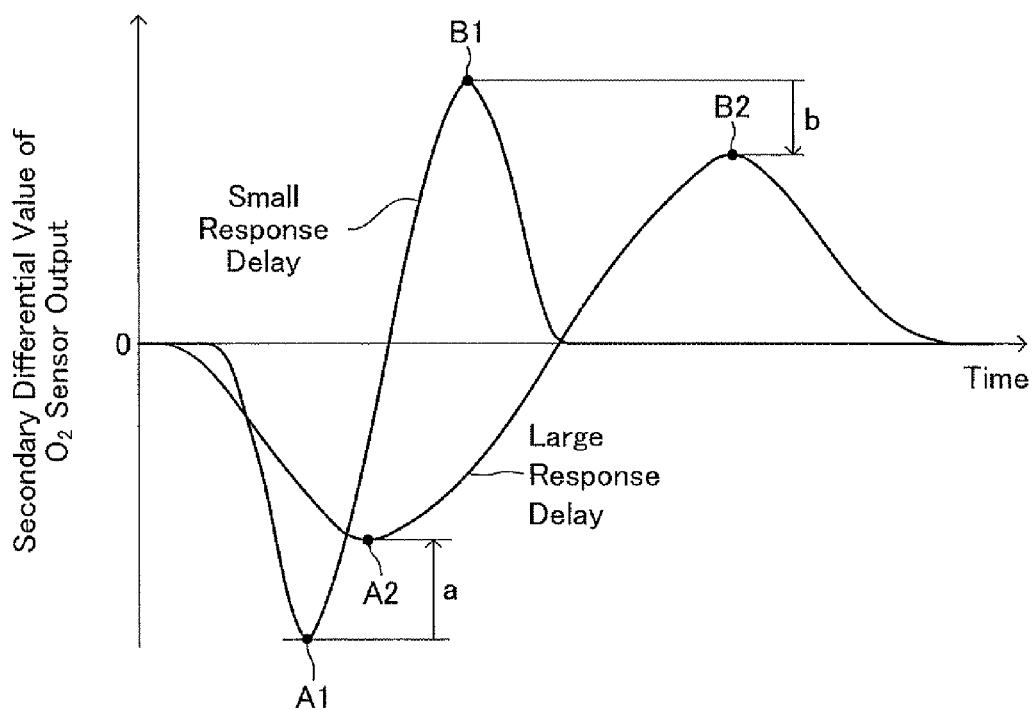
FIG. 19 is a graph showing the transition of the secondary differential values with respect to time of the transitions of the respective output values of the downstream air-fuel ratio sensor shown in FIG. 18.

Thereby, regardless of the degradation degree of the catalyst 53, the responsibility (response delay, time constant τ) of the downstream air-fuel ratio sensor 67 can be accurately acquired. The time constant thus acquired is served for correcting the maximum oxygen storage capacity Cmax acquired by the execution of the active control. Specifically, for example, based on the acquired time constant τ and the map shown in FIG. 16, the maximum oxygen storage capacity correction amount ΔCmax is calculated. In FIG. 16, τref is a reference value of a time constant τ, and, for example, it is a time constant corresponding to the case where the downstream air-fuel ratio sensor 67 is brand-new.

By subtracting ΔCmax from the maximum oxygen storage capacity Cmax acquired by the execution of the active control, the maximum oxygen storage capacity Cmax can be corrected. Thereby, the situation, where the maximum oxygen storage capacity Cmax is calculated to be larger than its actual amount when the downstream air-fuel ratio sensor 67 is degraded, can be suppressed. Namely, regardless of the degradation degree of the downstream air-fuel ratio sensor 67, the maximum oxygen storage capacity Cmax can be accurately acquired.

The present invention is not limited to the above-described embodiment, and various modifications can be adopted within the scope of the present invention. For example, although the transition of the sensor output value in the process in which the output value of the downstream air-fuel ratio sensor (sensor output value) is inverted from the minimum output value min to the maximum output value max during the execution of the active control is used, as shown in FIG. 17, FIG. 18, FIG. 19, and FIG. 20 respectively corresponding to FIG. 5, FIG. 6, FIG. 7, and FIG. 10, when the transition of the sensor output value in the process in which the output value of the downstream air-fuel ratio sensor (sensor output value) is inverted from the maximum output value max to the minimum output value min during the execution of the active control is used, similar action and effect can work well.

Namely, with respect to the process in which the sensor output value is inverted from the maximum output value max to the minimum output value min during the execution of the active control, when the degree of the degradation of the catalyst 53 is identical, the more the responsibility of the downstream air-fuel ratio sensor 67 decreases (the more the delay in response increases), the more the local maximum and minimum values of the secondary differential value of the sensor output value decreases. In this case, the decrement b in the local maximum value due to the progression of the decrease in the responsibility of the downstream air-fuel ratio sensor 67 (increase in the response delay) is smaller than the decrement a in the local minimum value due to the progression of the decrease in the responsibility of the downstream air-fuel ratio sensor 67 (increase in the response delay) (refer to FIG. 19).

In addition, when the response delay is identical, the more the degradation of the catalyst 53 progresses, the more the local maximum and minimum values of the secondary differential value of the sensor output value increases. In this case, the increment in the local maximum value due to the progression of the degradation of the catalyst 53 is larger than the increment in the local maximum value due to the progression of the degradation of the catalyst 53.

Figure 20:
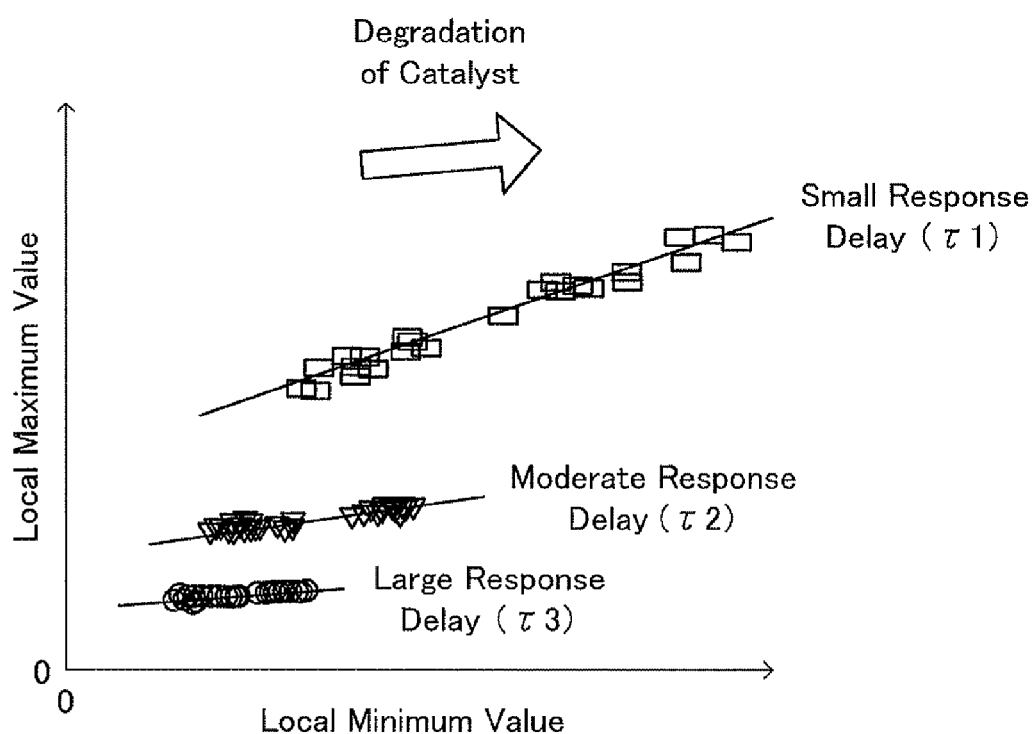
FIG. 20 is a graph showing a map defining the relation between the delay in response of the downstream air-fuel ratio sensor and the local maximum and minimum values in the secondary differential values of the output values of the upstream air-fuel ratio sensor when the output value of the downstream air-fuel ratio sensor is inverted from the maximum value to the minimum value, for each of many cases where the degrees of degradation of the three-way catalyst are different.

Taking the above tendency into account, the map shown in FIG. 20 corresponds to the map obtained by interchanging the "local maximum value" and the "local minimum value" in the map shown in FIG. 10. By preliminarily acquiring and memorizing these relations as maps as shown in FIG. 10 and applying the "local maximum and minimum values of the secondary differential value of the sensor output value" calculated from the transition of the sensor output value acquired during the execution of the active control, the response delay (time constant) of the downstream air-fuel ratio sensor 67 is acquired.

Figure 21:
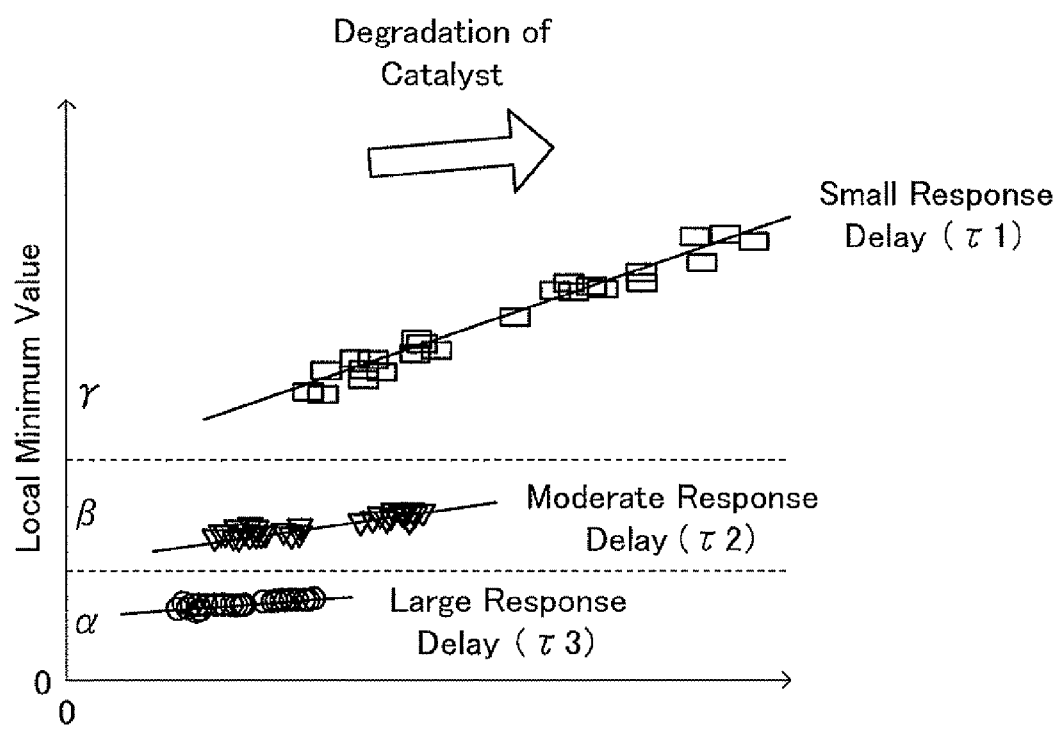
FIG. 21 is a graph showing a map defining the relation between the delay in response of the downstream air-fuel ratio sensor and the local minimum value in the secondary differential values of the output values of the upstream air-fuel ratio sensor when the output value of the downstream air-fuel ratio sensor is inverted from the minimum value to the maximum value, for each of many cases where the degrees of degradation of the three-way catalyst are different.

Although, in the above-described embodiment, the response delay (time constant) of the downstream air-fuel ratio sensor is acquired by applying the calculated local maximum and minimum values (refer to FIG. 7) to the map shown in FIG. 10, the response delay (time constant) of the downstream air-fuel ratio sensor can be acquired by applying only the calculated local minimum value (refer to FIG. 7) to the map shown in FIG. 21.

In this case, based on which regions α, β, or γ the calculated local minimum value (refer to FIG. 7) belongs to, the response delay (time constant) of the downstream air-fuel ratio sensor is classified into any of "large response delay" (τ3), "moderate response delay" (τ2), and "small response delay" (τ1) (τ1<τ2<τ3).

Thus, as compared with the above-described embodiment, although the accuracy of the response delay (time constant) of the downstream air-fuel ratio sensor 67 is low, the response delay (time constant) of the downstream air-fuel ratio sensor can be acquired by utilizing only the calculated local minimum value (refer to FIG. 7). As apparent from FIG. 10 and FIG. 21, it is very difficult to acquire the response delay (time constant) of the downstream air-fuel ratio sensor by using only the calculated local maximum value (refer to FIG. 7).

Although, in the above-described embodiment, as shown in FIG. 10, FIG. 20 and the like, the response delay of the downstream air-fuel ratio sensor is acquired based on the "relation between the response delay of the downstream air-fuel ratio sensor and the local maximum and minimum values" acquired for each of the multiple cases with different degradation degree of the catalyst 53, the response delay of the downstream air-fuel ratio sensor may be acquired based on the "relation between the response delay of the downstream air-fuel ratio sensor and the local maximum and minimum values" acquired only for the catalyst 53 with one degradation degree of the catalyst 53.

In this case, although, in accordance with the actual degradation degree of the catalyst 53, the accuracy of the acquired responsibility (response delay, time constant τ) of the downstream air-fuel ratio sensor 67 may decrease, the acquired responsibility (response delay, time constant τ) of the downstream air-fuel ratio sensor 67 can be acquired.

Also, although the extrema (local maximum and minimum values) in the secondary differential values of the sensor output value are used in the above-described embodiment, the extrema (local maximum and minimum values) in the secondary or more differential value (for example, tertiary differential value, quartic differential value) of the sensor output value may be used. This is based on that "the more the responsibility of the downstream air-fuel ratio sensor 67 decreases (the more the delay in response increases), the more the local maximum value and local minimum value in the secondary or more differential values with respect to time of the sensor output values."

What is claimed is:

1. An apparatus for acquiring the responsibility of an oxygen concentration sensor comprising:
   a three-way catalyst disposed in an exhaust channel of an internal combustion engine,
   an electromotive force-type oxygen concentration sensor disposed below said three-way catalyst in said exhaust channel to generate an output value corresponding to the air-fuel ratio in the exhaust gas flowing out of said three-way catalyst,
   an air-fuel ratio control means to control the air-fuel ratio in the exhaust gas flowing into said three-way catalyst,
   a calculation means to calculate local maximum and/or minimum values in the secondary or more differential value with respect to time of said output value in a first case wherein, by adjusting said air-fuel ratio to a rich air-fuel ratio, which is richer than the theoretical air-fuel ratio, by means of said air-fuel ratio control means, the output value of said oxygen concentration sensor transitions so as to be inverted from a first predetermined value, which corresponds to an air-fuel ratio leaner than the theoretical air-fuel ratio, to a second predetermined value, which corresponds to an air-fuel ratio richer than the theoretical air-fuel ratio and is larger than said first predetermined value, or local maximum and/or minimum values in the secondary or more differential value with respect to time of said output value in a second case wherein, by adjusting said air-fuel ratio to a lean air-fuel ratio, which is leaner than the theoretical air-fuel ratio, by means of said air-fuel ratio control means, the output value of said oxygen concentration sensor transitions so as to be inverted from said second predetermined value to said first predetermined value, and
   a responsibility acquisition means to acquire the responsibility of said oxygen concentration sensor based on said calculated local maximum and/or minimum values.

2. An apparatus for acquiring the responsibility of an oxygen concentration sensor comprising:
   a three-way catalyst disposed in an exhaust channel of an internal combustion engine,
   an electromotive force-type oxygen concentration sensor disposed below said three-way catalyst in said exhaust channel to generate an output value corresponding to the air-fuel ratio in the exhaust gas flowing out of said three-way catalyst,
   an air-fuel ratio control means to control the air-fuel ratio in the exhaust gas flowing into said three-way catalyst,
   a calculation means to calculate, as a first extremum, a local minimum value in the secondary differential value with respect to time of said output value in a first case wherein, by adjusting said air-fuel ratio to a rich air-fuel ratio, which is richer than the theoretical air-fuel ratio, by means of said air-fuel ratio control means, the output value of said oxygen concentration sensor transitions so as to be inverted from a first predetermined value, which corresponds to an air-fuel ratio leaner than the theoretical air-fuel ratio, to a second predetermined value, which corresponds to an air-fuel ratio richer than the theoretical air-fuel ratio and is larger than said first predetermined value, or a local maximum value in the secondary differential value with respect to time of said output value in a second case wherein, by adjusting said air-fuel ratio to a lean air-fuel ratio, which is leaner than the theoretical air-fuel ratio, by means of said air-fuel ratio control means, the output value of said oxygen concentration sensor transitions so as to be inverted from said second predetermined value to said first predetermined value, and
   a responsibility acquisition means to acquire the responsibility of said oxygen concentration sensor based on said calculated first extremum.

3. An apparatus for acquiring the responsibility of an oxygen concentration sensor according to claim 2, wherein:
   said responsibility acquisition means comprises a memorizing means to memorize a preliminarily acquired relation between the responsibility of said oxygen concentration sensor and said first extremum obtained in said first case or said second case, and is configured so as to acquire the responsibility of said oxygen concentration sensor based on said calculated first extremum and said memorized relation.

4. An apparatus for acquiring the responsibility of an oxygen concentration sensor according to claim 3, wherein:
   said memorizing means is configured so as to memorize said relation for each of multiple cases where the degradation degree of said three-way catalyst are different.

5. An apparatus for acquiring the responsibility of an oxygen concentration sensor comprising:
   a three-way catalyst disposed in an exhaust channel of an internal combustion engine,
   an electromotive force-type oxygen concentration sensor disposed below said three-way catalyst in said exhaust channel to generate an output value corresponding to the air-fuel ratio in the exhaust gas flowing out of said three-way catalyst,
   an air-fuel ratio control means to control the air-fuel ratio in the exhaust gas flowing into said three-way catalyst,
   a calculation means to calculate, as a first extremum, a local minimum value in the secondary differential value with respect to time of said output value in a first case wherein, by adjusting said air-fuel ratio to a rich air-fuel ratio, which is richer than the theoretical air-fuel ratio, by means of said air-fuel ratio control means, the output value of said oxygen concentration sensor transitions so as to be inverted from a first predetermined value, which corresponds to an air-fuel ratio leaner than the theoretical air-fuel ratio, to a second predetermined value, which corresponds to an air-fuel ratio richer than the theoretical air-fuel ratio and is larger than said first predetermined value, or a local maximum value in the secondary differential value with respect to time of said output value in a second case wherein, by adjusting said air-fuel ratio to a lean air-fuel ratio, which is leaner than the theoretical air-fuel ratio, by means of said air-fuel ratio control means, the output value of said oxygen concentration sensor transitions so as to be inverted from said second predetermined value to said first predetermined value, and to calculate, as a second extremum, a local maximum value in the secondary differential value with respect to time of said output value in the first case, or a local minimum value in the secondary differential value with respect to time of said output value in the second case, and a responsibility acquisition means to acquire the responsibility of said oxygen concentration sensor based on said calculated first extremum and said calculated second extremum.

6. An apparatus for acquiring the responsibility of an oxygen concentration sensor according to claim 5, wherein:

said responsibility acquisition means comprises a memorizing means to memorize a preliminarily acquired relation between the responsibility of said oxygen concentration sensor and said first extremum and said second extremum obtained in said first case or said second case, and is configured so as to acquire the responsibility of said oxygen concentration sensor based on said calculated first extremum, said calculated second extremum, and said memorized relation.

7. An apparatus for acquiring the responsibility of an oxygen concentration sensor according to claim 6, wherein:

said memorizing means is configured so as to memorize said relation for each of multiple cases where the degradation degree of said three-way catalyst are different.

8. An apparatus for acquiring the responsibility of an oxygen concentration sensor according to claim 1, wherein:

said calculation means is configured so as to switch said air-fuel ratio from said rich air-fuel ratio to said lean air-fuel ratio based on that the output value of said oxygen concentration sensor is inverted from said first predetermined value to said second predetermined value, to switch said air-fuel ratio from said lean air-fuel ratio to said rich air-fuel ratio based on that the output value of said oxygen concentration sensor is inverted from said second predetermined value to said first predetermined value, to calculate the maximum oxygen storage capacity, which is the maximum value of the amount of oxygen that said three-way catalyst can absorb, every time when said air-fuel ratio is switched, as well as, to use, as said first case, a case where the output value of said oxygen concentration sensor transitions so as to be inverted from said first predetermined value to said second predetermined value in a condition where the degree of the discrepancy between the previous value and the current value of said calculated maximum oxygen storage capacity is judged as small, or, to use, as said second case, a case where the output value of said oxygen concentration sensor transitions so as to be inverted from said second predetermined value to said first predetermined value in a condition where the degree of the discrepancy between the previous value and the current value of said calculated maximum oxygen storage capacity is judged as small.

* * * * *